US011893937B2

(12) United States Patent
Zhang

(10) Patent No.: US 11,893,937 B2
(45) Date of Patent: Feb. 6, 2024

(54) PIXEL CIRCUIT, DRIVING METHOD THEREOF, ARRAY SUBSTRATE, DISPLAY PANEL, AND DISPLAY DEVICE

(71) Applicant: Wuhan Tianma Microelectronics Co., Ltd., Wuhan (CN)

(72) Inventor: Qinyuan Zhang, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 17/859,353

(22) Filed: Jul. 7, 2022

(65) Prior Publication Data

US 2022/0335892 A1 Oct. 20, 2022

(30) Foreign Application Priority Data

Mar. 31, 2022 (CN) ........................ 202210337886.3

(51) Int. Cl.

*G09G 3/3233* (2016.01)
*G09G 3/3275* (2016.01)
*G09G 3/3266* (2016.01)

(52) U.S. Cl.

CPC ......... *G09G 3/3233* (2013.01); *G09G 3/3266* (2013.01); *G09G 3/3275* (2013.01); *G09G 2300/0426* (2013.01); *G09G 2300/0842* (2013.01); *G09G 2310/0278* (2013.01); *G09G 2310/0286* (2013.01)

(58) Field of Classification Search

CPC ...... G09G 3/32; G09G 3/3233; G09G 3/3266; G09G 3/3275; G09G 2300/0426; G09G 2300/0819; G09G 2300/0842; G09G 2300/0861; G09G 2310/0251; G09G 2310/0278; G09G 2310/0286; G09G 2320/045

See application file for complete search history.

(56) References Cited

U.S. PATENT DOCUMENTS

| | | | | |
|---|---|---|---|---|
| 2002/0059031 A1* | 5/2002 | Shimura | .............. | A61B 5/4088<br>702/19 |
| 2023/0154405 A1* | 5/2023 | Noh | ..................... | G09G 3/3233<br>345/204 |

FOREIGN PATENT DOCUMENTS

| | | | | |
|---|---|---|---|---|
| CN | 107564467 A | 1/2018 | | |
| CN | 113990236 A * | 1/2022 | ........... | G09G 3/3266 |
| JP | 2005106993 A * | 4/2005 | ......... | H01L 27/1214 |

* cited by examiner

*Primary Examiner* — Stacy Khoo
(74) *Attorney, Agent, or Firm* — KDW Firm PLLC

(57) ABSTRACT

Provided are a pixel circuit, a driving method thereof, an array substrate, a display panel, and a display device. The pixel circuit includes a drive module, a first initialization module, and a data write module. A control terminal of the drive module is electrically connected to a first node, a first terminal of the drive module is electrically connected to a first power supply voltage terminal, and a second terminal of the drive module is electrically connected to a first electrode of a light-emitting element. The first initialization module includes a first N-type transistor and a second N-type transistor, where a control terminal of the first N-type transistor is electrically connected to a scan signal terminal, a first terminal of the first N-type transistor is electrically connected to a first reference signal terminal, a second terminal is electrically connected to a first terminal of the second N-type transistor.

27 Claims, 17 Drawing Sheets

PIXEL CIRCUIT, DRIVING METHOD THEREOF, ARRAY SUBSTRATE, DISPLAY PANEL, AND DISPLAY DEVICE

CROSS-REFERENCE TO RELATED APPLICATION

This application claims priority to Chinese Patent Application No. 202210337886.3 filed Mar. 31, 2022, the disclosure of which is incorporated herein by reference in its entirety.

TECHNICAL FIELD

Embodiments of the present disclosure relate to the field of display technologies and, in particular, to a pixel circuit, a driving method thereof, an array substrate, a display panel, and a display device.

BACKGROUND

With the development of display technologies, an organic light emitting diode (OLED) display is more and more widely used in the display field due to advantages of active light emission, a wide viewing angle, a high contrast ratio, low power consumption and fast response speed and gradually replace the traditional liquid crystal display (LCD).

To improve the display stability of the OLED, a pixel circuit that drives the OLED to emit light includes multiple transistors. Compared with low temperature polysilicon (LTPS) transistors, metal oxide (such as indium gallium zinc oxide (IGZO)) transistors have advantages of high transmittance, low electron mobility, a large on-off ratio and low power consumption. In the design of the existing pixel circuit, the IGZO transistors replace part of the LTPS transistors, so as to reduce the leakage current of the circuit. However, since two different types of transistors, that are LTPS P-type transistors and IGZO N-type transistors, exist in the pixel circuit, three sets of different scan circuits are required for driving in the pixel circuit so that a narrower frame cannot be obtained.

SUMMARY

Embodiments of the present disclosure provide a pixel circuit, a driving method thereof, an array substrate, a display panel, and a display device. The pixel circuit only needs two sets of scan circuits for driving so that the peripheral driver circuit is simplified and a narrower frame of the display panel is achieved.

In a first aspect, an embodiment of the present disclosure provides a pixel circuit. The pixel circuit includes a drive module, a first initialization module, and a data write module.

A control terminal of the drive module is electrically connected to a first node, a first terminal of the drive module is electrically connected to a first power supply voltage terminal, and a second terminal of the drive module is electrically connected to a first electrode of a light-emitting element.

The first initialization module includes a first N-type transistor and a second N-type transistor, where a control terminal of the first N-type transistor is electrically connected to a scan signal terminal, a first terminal of the first N-type transistor is electrically connected to a first reference signal terminal, a second terminal of the first N-type transistor is electrically connected to a first terminal of the second N-type transistor, a control terminal of the second N-type transistor is electrically connected to an enable signal terminal, and a second terminal of the second N-type transistor is electrically connected to the first node.

A control terminal of the data write module is electrically connected to the scan signal terminal, a first terminal of the data write module is electrically connected to a data signal terminal, and a second terminal of the data write module is electrically connected to the first terminal of the drive module.

In a second aspect, an embodiment of the present disclosure further provides a driving method of a pixel circuit. The method is used for driving the preceding pixel circuit and includes steps described below.

In an initialization stage, a first initialization module is controlled to be turned on, a data write module and a drive module are controlled to be turned off, and the first initialization module initializes a potential of a first node.

In a data write stage, the data write module and the drive module are controlled to be turned on, the first initialization module is controlled to be turned off, and the data write module writes a data signal into the first node.

In a light emission stage, the drive module is controlled to be turned on, the data write module and the first initialization module are controlled to be turned off, the drive module provides a drive current to a light-emitting element, and the light-emitting element emits light in response to the drive current.

In a third aspect, an embodiment of the present disclosure further provides an array substrate including a display region, where the display region includes a plurality of pixel circuits arranged in an array.

In a fourth aspect, an embodiment of the present disclosure further provides a display panel including the preceding array substrate.

In a fifth aspect, an embodiment of the present disclosure further provides a display device including the preceding display panel.

The pixel circuit provided in the embodiments of the present disclosure includes a drive module, a first initialization module, and a data write module. A control terminal of the drive module is electrically connected to a first node, a first terminal of the drive module is electrically connected to a first power supply voltage terminal, and a second terminal of the drive module is electrically connected to a first electrode of a light-emitting element. The first initialization module includes a first N-type transistor and a second N-type transistor, where a control terminal of the first N-type transistor is electrically connected to a scan signal terminal, a first terminal of the first N-type transistor is electrically connected to a first reference signal terminal, a second terminal of the first N-type transistor is electrically connected to a first terminal of the second N-type transistor, a control terminal of the second N-type transistor is electrically connected to an enable signal terminal, and a second terminal of the second N-type transistor is electrically connected to the first node. A control terminal of the data write module is electrically connected to the scan signal terminal, a first terminal of the data write module is electrically connected to a data signal terminal, and a second terminal of the data write module is electrically connected to the first terminal of the drive module. Compared with the related art, the pixel circuit provided in the embodiments of the present disclosure only needs one scan signal terminal and one enable signal terminal, and only two sets of scan circuits need to be disposed for driving, which is conducive to simplifying the peripheral driver circuit and achieving a narrower frame of the display panel.

DETAILED DESCRIPTION

Figure 1:
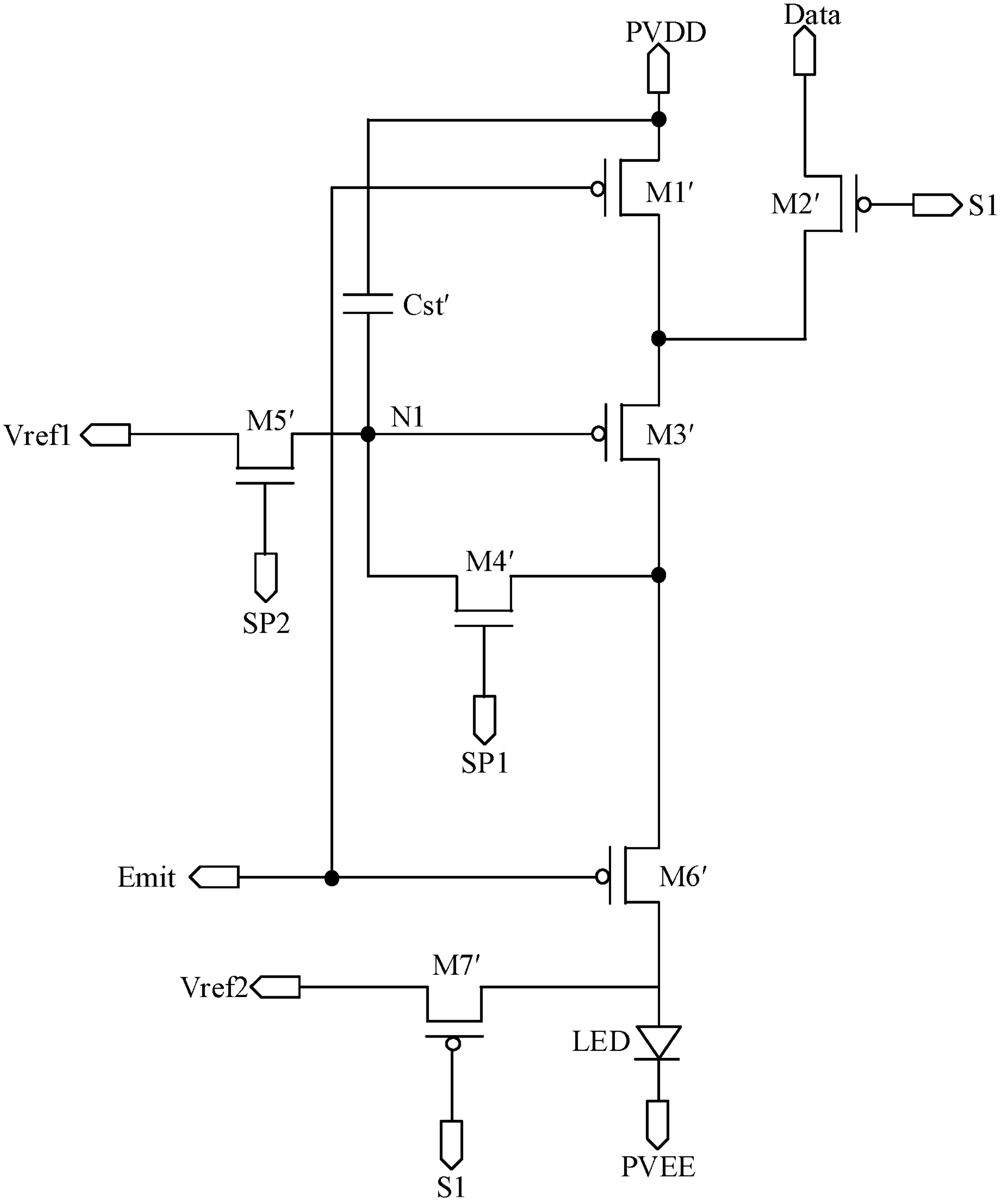
FIG. 1 is a structural diagram of a pixel circuit in the related art.

The present disclosure is further described hereinafter in detail in conjunction with drawings and embodiments. It is to be understood that embodiments described hereinafter are merely intended to explain the present disclosure and not to limit the present disclosure. Additionally, it is to be noted that for ease of description, only part, not all, of structures related to the present disclosure are illustrated in the drawings.

Terms used in embodiments of the present disclosure are merely used for describing the specific embodiments and not intended to limit the present disclosure. It is to be noted that spatially related terms, including "on", "below", "left" and "right" described in the embodiments of the present disclosure, are described from the perspective of the drawings and are not to be construed as a limitation to the embodiments of the present disclosure. In addition, in the context, it is to be understood that when a component is formed "on" or "below" another component, the component may not only be directly formed "on" or "below" another component and may also be indirectly formed "on" or "below" another component via an intermediate component. Terms "first", "second" and the like are merely used for description and distinguishing between different components rather than indicating any order, quantity, or importance. For those of ordinary skill in the art, the preceding terms can be construed according to specific situations in the present disclosure.

FIG. 1 is a structural diagram of a pixel circuit in the related art. Referring to FIG. 1, the pixel circuit includes seven transistors M1' to M7' and one capacitor Cst', where M1', M2', M3', M6' and M7' are all low temperature polysilicon (LTPS) P-type transistors, and to reduce the leakage current of an N1 node, M4' and M5' are all indium gallium zinc oxide (IGZO) N-type transistors. In the pixel circuit shown in FIG. 1, gates of M1' and M6' are connected to an enable signal terminal Emit, gates of M2' and M7' are connected to a scan signal terminal S1, a gate of M4' is connected to a scan signal terminal SP1, and a gate of M5' is connected to a scan signal terminal SP2. Since the pixel circuit includes two different types of transistors, three sets of scan circuits SP (SP1 and SP2), S (S1) and Emit need to provide three different timing drives for scan signals respectively when the circuits are controlled so that left and right frames of the display panel become larger, making it impossible to acquire a narrower frame.

Figure 2:
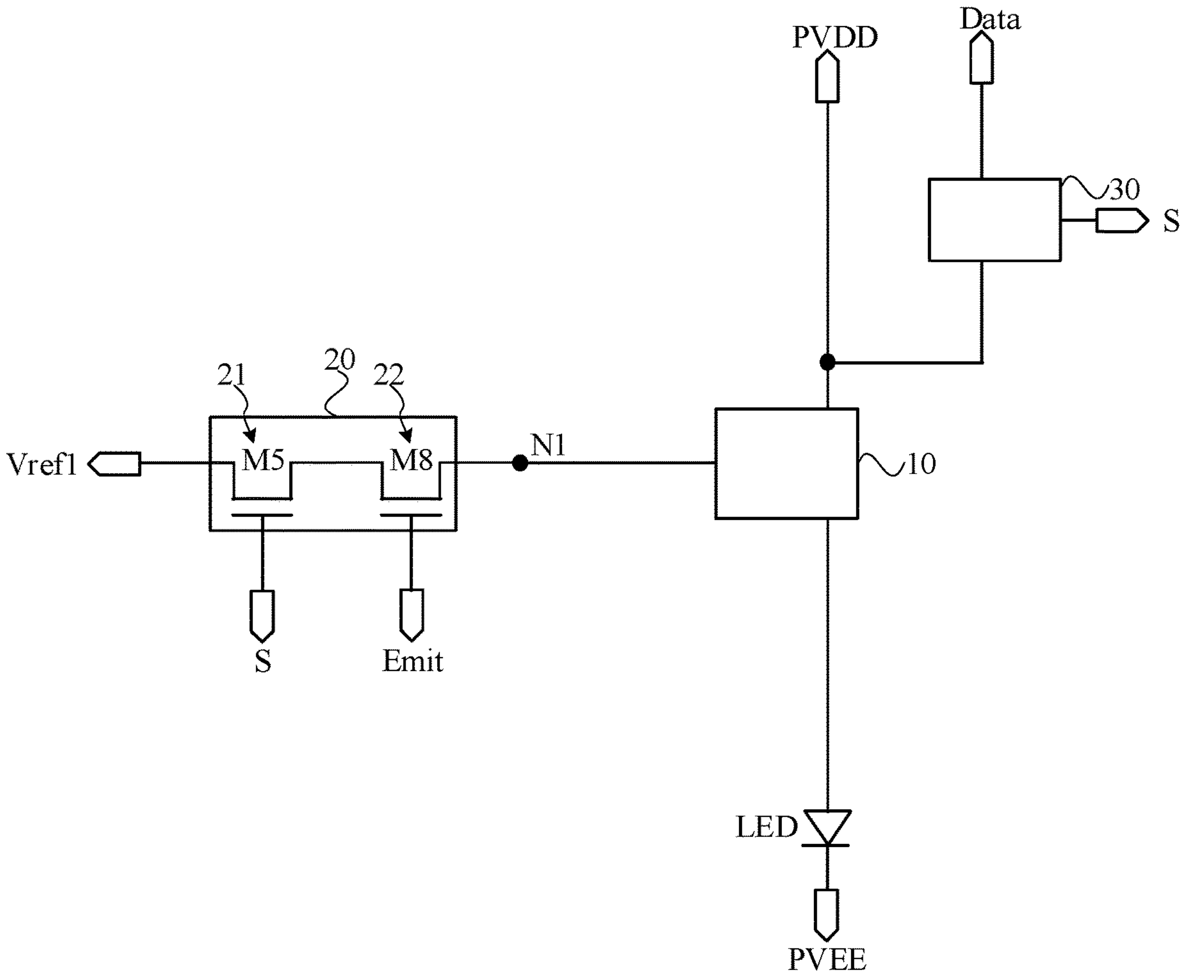
FIG. 2 is a structural diagram of a pixel circuit according to an embodiment of the present disclosure.

To solve the preceding problem, FIG. 2 is a structural diagram of a pixel circuit according to an embodiment of the present disclosure. Referring to FIG. 2, the pixel circuit includes a drive module 10, a first initialization module 20, and a data write module 30. A control terminal of the drive module 10 is electrically connected to a first node N1, a first terminal of the drive module 10 is electrically connected to a first power supply voltage terminal PVDD, and a second terminal of the drive module 10 is electrically connected to a first electrode of a light-emitting element (for example, a light-emitting diode (LED)). The first initialization module 20 includes a first N-type transistor 21 (M5) and a second N-type transistor 22 (M8), where a control terminal of the first N-type transistor 21 is electrically connected to a scan signal terminal S, a first terminal of the first N-type transistor 21 is electrically connected to a first reference signal terminal Vref1, a second terminal of the first N-type transistor 21 is electrically connected to a first terminal of the second N-type transistor 22, a control terminal of the second N-type transistor 22 is electrically connected to an enable signal terminal Emit, and a second terminal of the second N-type transistor 22 is electrically connected to the first node N1. A control terminal of the data write module 30 is electrically connected to the scan signal terminal S, a first terminal of the data write module 30 is electrically connected to a data signal terminal Data, and a second terminal of the data write module 30 is electrically connected to the first terminal of the drive module 10.

The drive module 10 is configured to drive the light-emitting element LED to emit light according to a data signal, and the drive module 10 may include a drive transistor formed by an N-type transistor or a P-type transistor. During specific implementation, the electrical connection between the first terminal of the drive module 10 and the first power supply voltage terminal PVDD may be direct electrical connection, indirect electrical connection by interposing other elements, or coupling connection. The data write module 30 is configured to write a data signal into the first node N1 under the control of the corresponding scan signal terminal S, and the data signal is used for controlling a magnitude of a drive current outputted by the drive module 10 so as to control the brightness of the light-emitting element. The data write module 30 may include a P-type transistor. The first initialization module 20 is configured to initialize a voltage of the first node N1, and a control signal outputted by the scan signal terminal S and a control signal outputted by the enable signal terminal Emit control the on and off of the first N-type transistor 21 and the second N-type transistor 22, respectively. The control terminal of the first N-type transistor 21 and the control terminal of the data write module 30 are connected to the same scan signal terminal S, thereby achieving the effect of reducing a set of scan circuits compared with the related art.

The pixel circuit provided in the embodiments of the present disclosure only needs one scan signal terminal and one enable signal terminal, and only two sets of scan circuits need to be disposed for driving, which is conducive to simplifying the peripheral driver circuit and achieving a narrower frame of the display panel.

Figure 3:
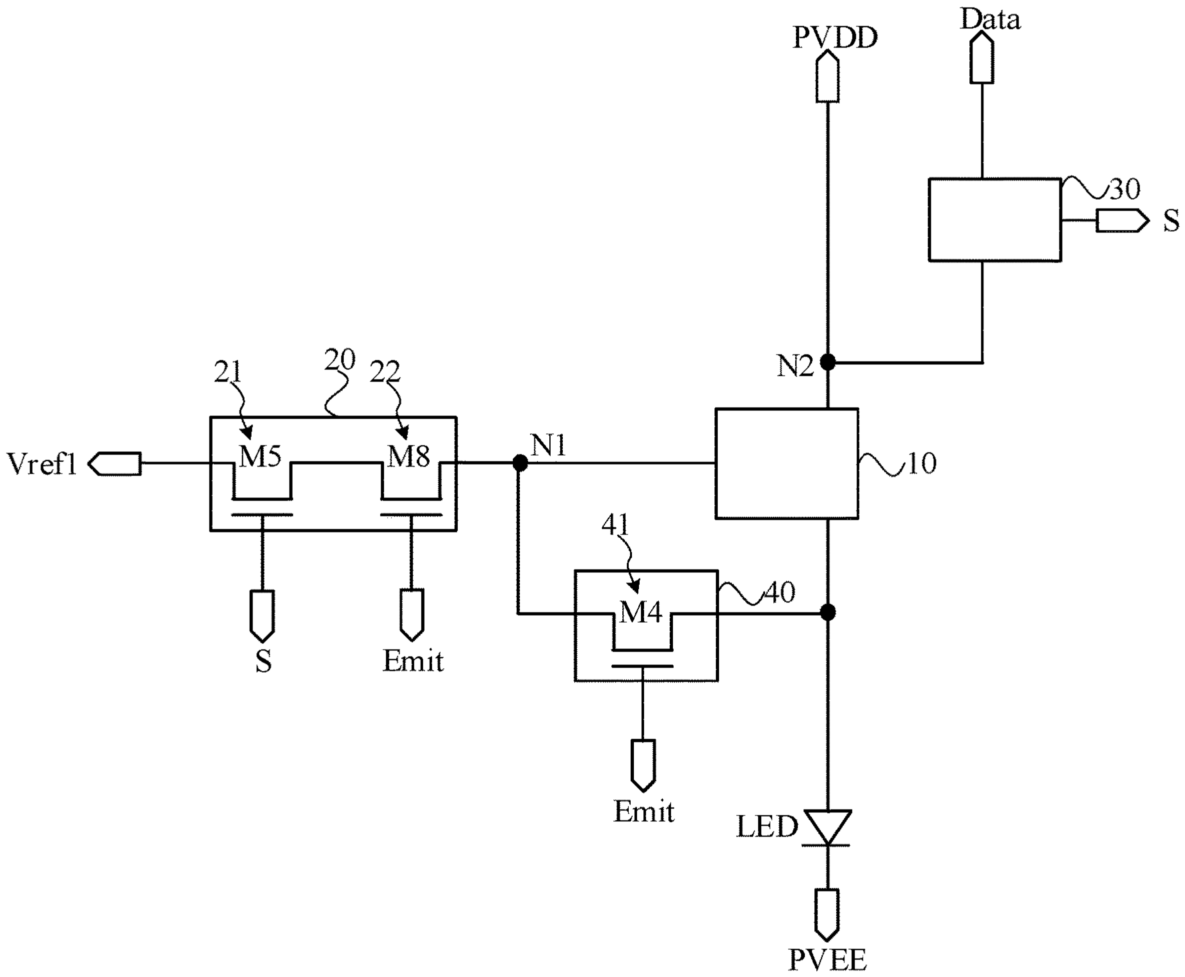
FIG. 3 is a structural diagram of another pixel circuit according to an embodiment of the present disclosure.

FIG. 3 is a structural diagram of another pixel circuit according to an embodiment of the present disclosure. Referring to FIG. 3, optionally, the pixel circuit further includes a threshold compensation module 40, where the threshold compensation module 40 includes a third N-type transistor 41 (M4), where a control terminal of the third N-type transistor 41 is electrically connected to the enable signal terminal Emit, a first terminal of the third N-type transistor 41 is electrically connected to the second terminal of the drive module 10, and a second terminal of the third N-type transistor 41 is electrically connected to the first node N1.

The threshold compensation module 40 is configured to achieve the threshold compensation of a gate of the drive transistor in the drive module 10. During specific implementation, when the data write module 30 writes the data signal into the first node N1, the control signal of the enable signal terminal Emit controls the third N-type transistor 41 to be turned on, and a data voltage $V_{Data}$ provided by the data signal terminal Data is written into the first node N1 through the drive module 10 and the third N-type transistor 41. A voltage of a second node N2 is $V_{Data}$, and a voltage of the first node N1 is $V_{Data}$-$V_{th}$, where $V_{th}$ denotes a threshold voltage of the drive transistor in the drive module. A voltage related to $V_{th}$ is prestored in the first node N1, and a quantity related to $V_{th}$ in a current formula of the light-emitting element may be eliminated so that a current flowing through the light-emitting element is independent of $V_{th}$, thereby achieving threshold compensation.

Optionally, in this embodiment, the first N-type transistor 21, the second N-type transistor 22, and the third N-type transistor 41 are all transistors including oxide semiconductors, for example, IGZO transistors. In other embodiments, the first N-type transistor 21, the second N-type transistor 22, and the third N-type transistor 41 may also be other types of oxide semiconductor transistors, which may be selected according to actual conditions during specific implementation.

Figure 4:
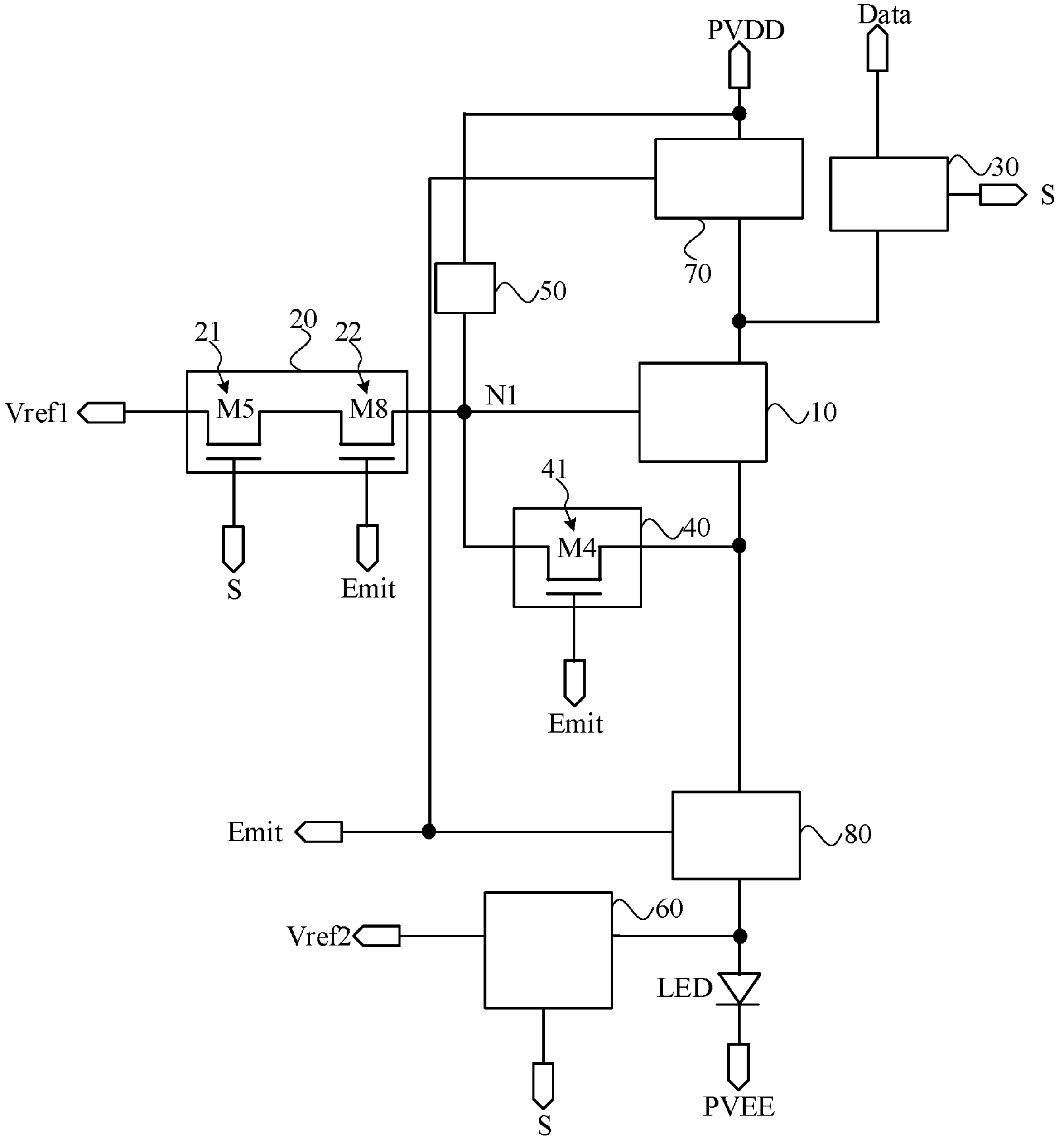
FIG. 4 is a structural diagram of another pixel circuit according to an embodiment of the present disclosure.

FIG. 4 is a structural diagram of another pixel circuit according to an embodiment of the present disclosure. Referring to FIG. 4, optionally, the pixel circuit further includes a storage module 50, a second initialization module 60, a first light emission control module 70 and/or a second light emission control module 80. A first terminal of the storage module 50 is electrically connected to the first power supply voltage terminal PVDD, and a second terminal of the storage module 50 is electrically connected to the first node N1. A control terminal of the second initialization module 60 is electrically connected to the scan signal terminal S, a first terminal of the second initialization module 60 is electrically connected to a second reference signal terminal Vref2, and a second terminal of the second initialization module 60 is electrically connected to the first electrode of the light-emitting element LED. A control terminal of the first light emission control module 70 is electrically connected to the enable signal terminal Emit, a first terminal of the light emission control terminal 70 is electrically connected to the first power supply voltage terminal PVDD, and a second terminal of the first light emission control module 70 is electrically connected to the first terminal of the drive module 10. A control terminal of the second light emission control module 80 is electrically connected to the enable signal terminal Emit, a first terminal of the second light emission control module 80 is electrically connected to the second terminal of the drive module 10, a second terminal of the second light emission control module 80 is electrically connected to the first electrode of the light-emitting element LED, and a second electrode of the light-emitting element LED is electrically connected to a second power supply voltage terminal PVEE.

The storage module 50 is configured to maintain a potential of the first node N1 in the case where the light-emitting element LED is in a light emission stage. The second initialization module 60 is configured to reset the first electrode (for example, an anode) of the light-emitting element LED before the light-emitting element LED emits light, so as to avoid the light emission brightness being affected by the light emission last time. The first light emission control module 70 and/or the second light emission control module 80 are configured to be turned on during light emission so that the drive current flows through the light-emitting element LED, thereby emitting light. In this embodiment, the first electrode of the light-emitting element LED is an anode, the second electrode of the light-emitting element LED is a cathode, the first power supply voltage terminal PVDD provides an anode voltage, and the second power supply voltage terminal PVEE provides a cathode voltage.

Figure 5:
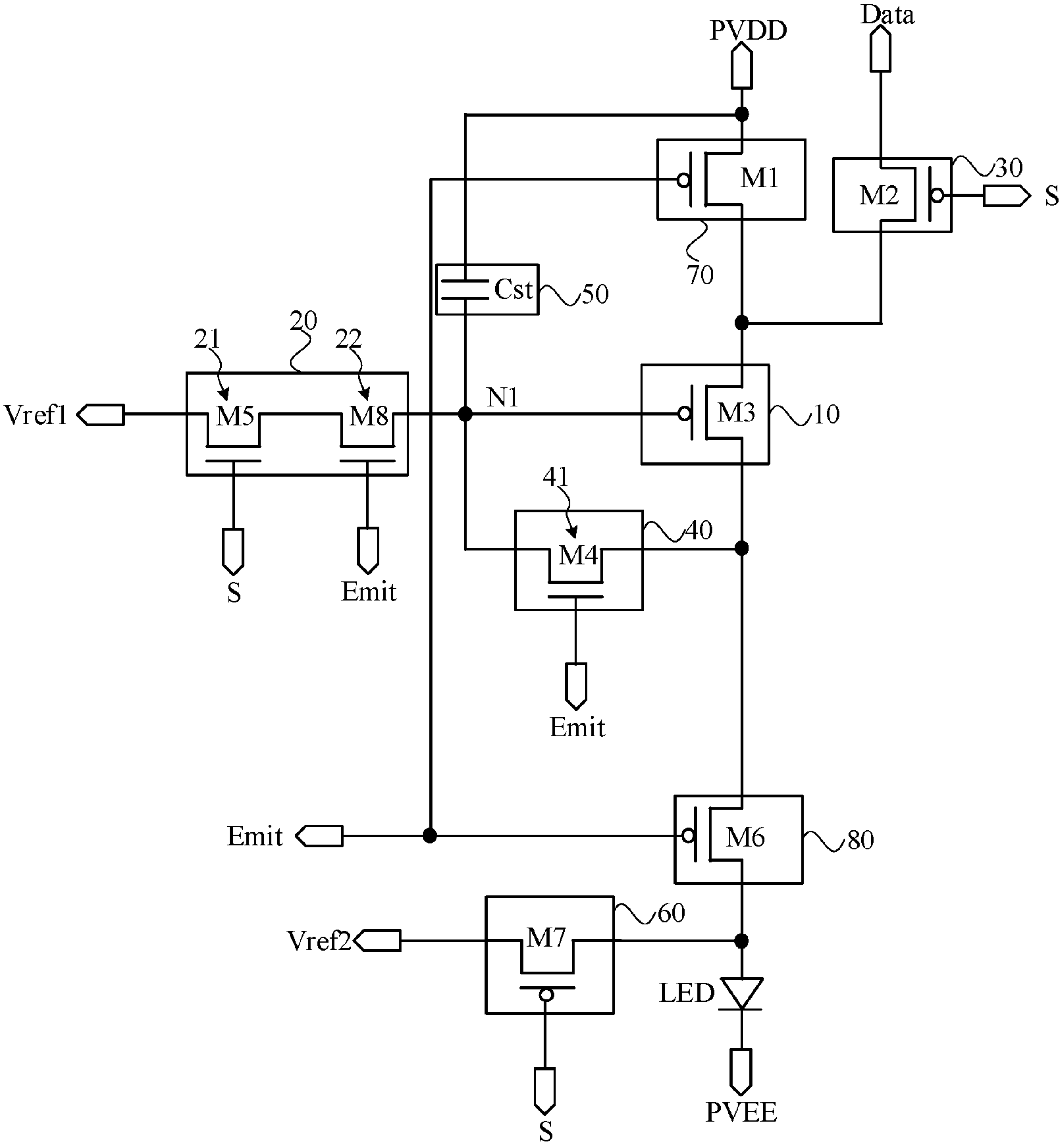
FIG. 5 is a schematic diagram of a specific circuit structure of a pixel circuit according to an embodiment of the present disclosure.

FIG. 5 is a schematic diagram of a specific circuit structure of a pixel circuit according to an embodiment of the present disclosure. Referring to FIG. 5, optionally, the drive module 10 includes a drive transistor M3, the data write module 30 includes a fourth transistor M2, the first light emission control module 70 includes a fifth transistor M1, the second light emission control module 80 includes a sixth transistor M6, the second initialization module 60 includes a seventh transistor M7, and the storage module 50 includes a first capacitor Cst. A control terminal of the fifth transistor M1 is electrically connected to the enable signal terminal Emit, a first terminal of the fifth transistor M1 is electrically connected to the first power supply voltage terminal PVDD, and a second terminal of the fifth transistor M1 is electrically connected to a first terminal of the drive transistor M3. A control terminal of the drive transistor M3 is electrically connected to the first node N1, and a second terminal of the drive transistor M3 is electrically connected to a first terminal of the sixth transistor M6. A control terminal of the fourth transistor M2 is electrically connected to the scan signal terminal S, a first terminal of the fourth transistor M2 is electrically connected to the data signal terminal Data, and a second terminal of the fourth transistor M2 is electrically connected to the first terminal of the drive transistor M3. A control terminal of the sixth transistor M6 is electrically connected to the enable signal terminal Emit, and a second terminal of the sixth transistor M6 is electrically connected to the first electrode of the light-emitting element LED. A control terminal of the seventh transistor M7 is electrically connected to the scan signal terminal S, a first terminal of the seventh transistor M7 is electrically connected to the second reference signal terminal Vref2, and a second terminal of the seventh transistor M7 is electrically connected to the first electrode of the light-emitting element LED. A first terminal of the first capacitor Cst is electrically connected to the first node N1, and a second terminal of the first capacitor Cst is electrically connected to the first power supply voltage terminal PVDD.

It is to be understood that, since the first initialization module 20 and the second initialization module 60 may work in different time periods, two initialization signals may also be provided by a same signal line at different times. By way of example, in this embodiment, a first reference signal terminal Ref1 and a second reference signal terminal Ref2 are the same signal terminal, thereby reducing the number of wires and simplifying the pixel circuit structure.

Optionally, in this embodiment, the drive transistor M3, the fourth transistor M2, the fifth transistor M1, the sixth transistor M6, and the seventh transistor M7 are all P-type transistors. Further, the P-type transistor includes an LTPS semiconductor. The transistor formed by an LTPS process has advantages of high mobility and fast charging.

Figure 6:
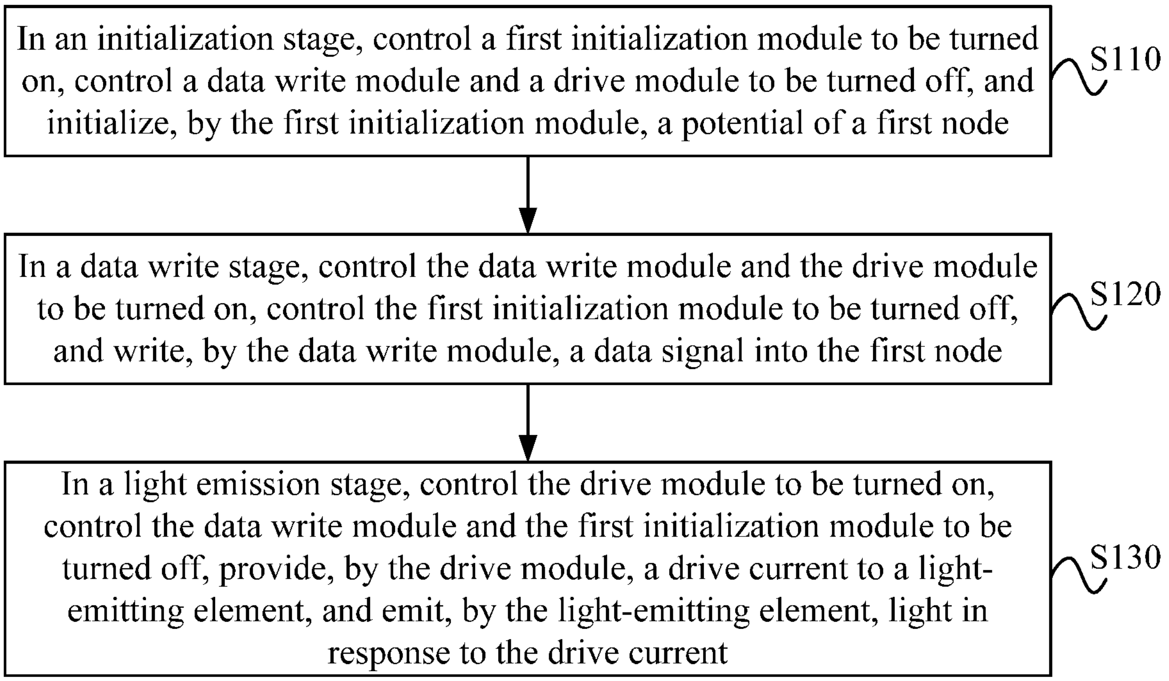
FIG. 6 is a flowchart of a driving method of a pixel circuit according to an embodiment of the present disclosure.

A specific structure of the pixel circuit provided in the embodiment of the present disclosure is introduced in the preceding embodiment. Compared with the existing pixel circuit, in the pixel circuit provided in the embodiment of the present disclosure, the number of scan circuits is reduced and the driving method is also different from the driving method in the related art. An operating principle of the pixel circuit is introduced in conjunction with the driving method of the pixel circuit. FIG. 6 is a flowchart of a driving method of a pixel circuit according to an embodiment of the present disclosure. The driving method is used for driving the pixel circuit provided in the preceding embodiments. Referring to FIG. 6, the driving method includes steps described below.

In step S110, in an initialization stage, a first initialization module is controlled to be turned on, a data write module and a drive module are controlled to be turned off, and the first initialization module initializes a potential of a first node.

The initialization stage is the first stage of pixel circuit control and used for initializing the potential of the first node. A reference voltage provided by the first reference signal terminal Vref1 is written into the first node through the first initialization module. For example, in the case where the drive transistor in the drive module is a P-type transistor, the reference voltage is a low-level signal, and a voltage of the low-level signal may be specifically selected according to actual conditions.

In step S120, in a data write stage, the data write module and the drive module are controlled to be turned on, the first initialization module is controlled to be turned off, and the data write module writes a data signal into the first node.

The data write stage is the second stage of pixel circuit control and used for writing the data signal into the first node. Voltage values of data signals are different so that the degrees of conduction of the drive transistor in the drive module are different in the subsequent light emission stage, thereby controlling the magnitude of the drive current and controlling the light-emitting element to achieve display with different brightnesses.

In step S130, in a light emission stage, the drive module is controlled to be turned on, the data write module and the first initialization module are controlled to be turned off, the drive module provides a drive current to a light-emitting element, and the light-emitting element emits light in response to the drive current.

The light emission stage is the third stage of pixel circuit control. According to the input of different data voltages in the previous stage, the display with different brightnesses of the light-emitting element may be achieved. For the entire display panel, all pixel circuits are scanned row by row, thereby achieving picture display.

Figure 7:
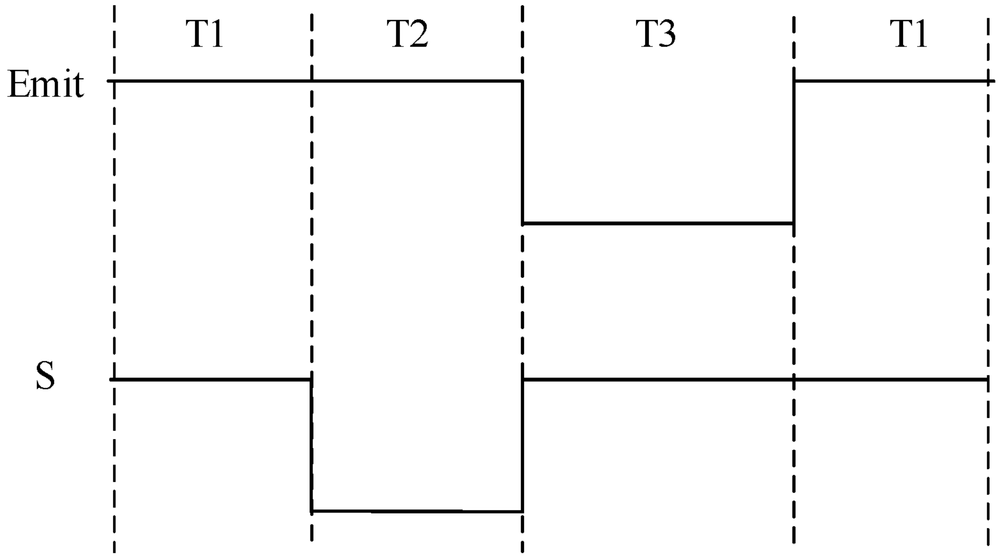
FIG. 7 is a schematic diagram of a driving timing of a control signal of a pixel circuit according to an embodiment of the present disclosure.

Optionally, the first initialization module includes a first N-type transistor and a second N-type transistor, where the control terminal of the first N-type transistor is electrically connected to the scan signal terminal S, and the control terminal of the second N-type transistor is connected to the enable signal terminal Emit. The pixel circuit further includes a threshold compensation module, where the threshold compensation module includes a third N-type transistor. The drive module includes a drive transistor M3, the data write module includes a fourth transistor M2, the first light emission control module includes a fifth transistor M1, the second light emission control module includes a sixth transistor M6, the second initialization module includes a seventh transistor M7, and the storage module includes a first capacitor Cst. FIG. 7 is a schematic diagram of a driving timing of a control signal of a pixel circuit according to an embodiment of the present disclosure, FIG. 8 is a structural diagram of a pixel circuit in an initialization stage according to an embodiment of the present disclosure, FIG. 9 is a structural diagram of a pixel circuit in a data write stage according to an embodiment of the present disclosure, and FIG. 10 is a structural diagram of a pixel circuit in a light emission stage according to an embodiment of the present disclosure.

Figure 8:
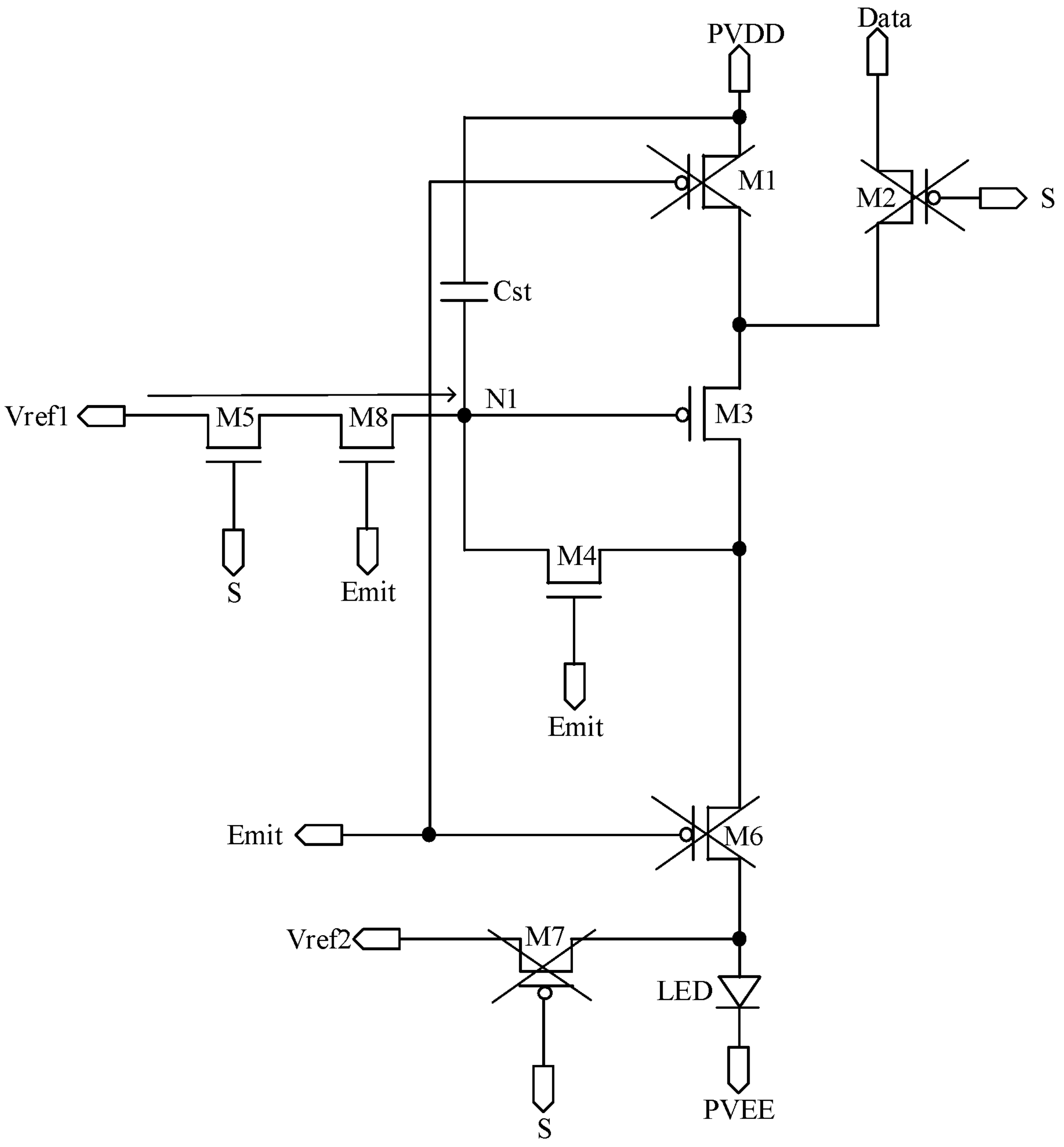
FIG. 8 is a structural diagram of a pixel circuit in an initialization stage according to an embodiment of the present disclosure.

Referring to FIGS. 7 and 8, in an initialization stage T1, the control signal outputted by the scan signal terminal S controls a first N-type transistor M5 to be turned on, and the control signal outputted by the enable signal terminal Emit controls a second N-type transistor M8 to be turned on so that the first initialization module is turned on.

It is to be understood that an N-type transistor is turned on in the case where a gate voltage is at a high level and a P-type transistor is turned on in the case where the gate voltage is at a low level. In the initialization stage T1, the scan signal terminal S outputs a high level, and the high level controls the first N-type transistor M5 to be turned on; the enable signal terminal Emit outputs a high level, and the high level controls the second N-type transistor M8 to be turned on. A reference voltage (a low level) provided by the first reference signal terminal Vref1 is inputted into the first node N1 through the first N-type transistor M5 and the second N-type transistor M8, thereby achieving the initialization of the first node N1. In this stage, the fifth transistor M1 and the sixth transistor M6 are turned off under the control of the high level provided by the enable signal terminal Emit, and the fourth transistor M2 and the seventh transistor M7 are turned off under the control of the high level provided by the scan signal terminal S.

Figure 9:
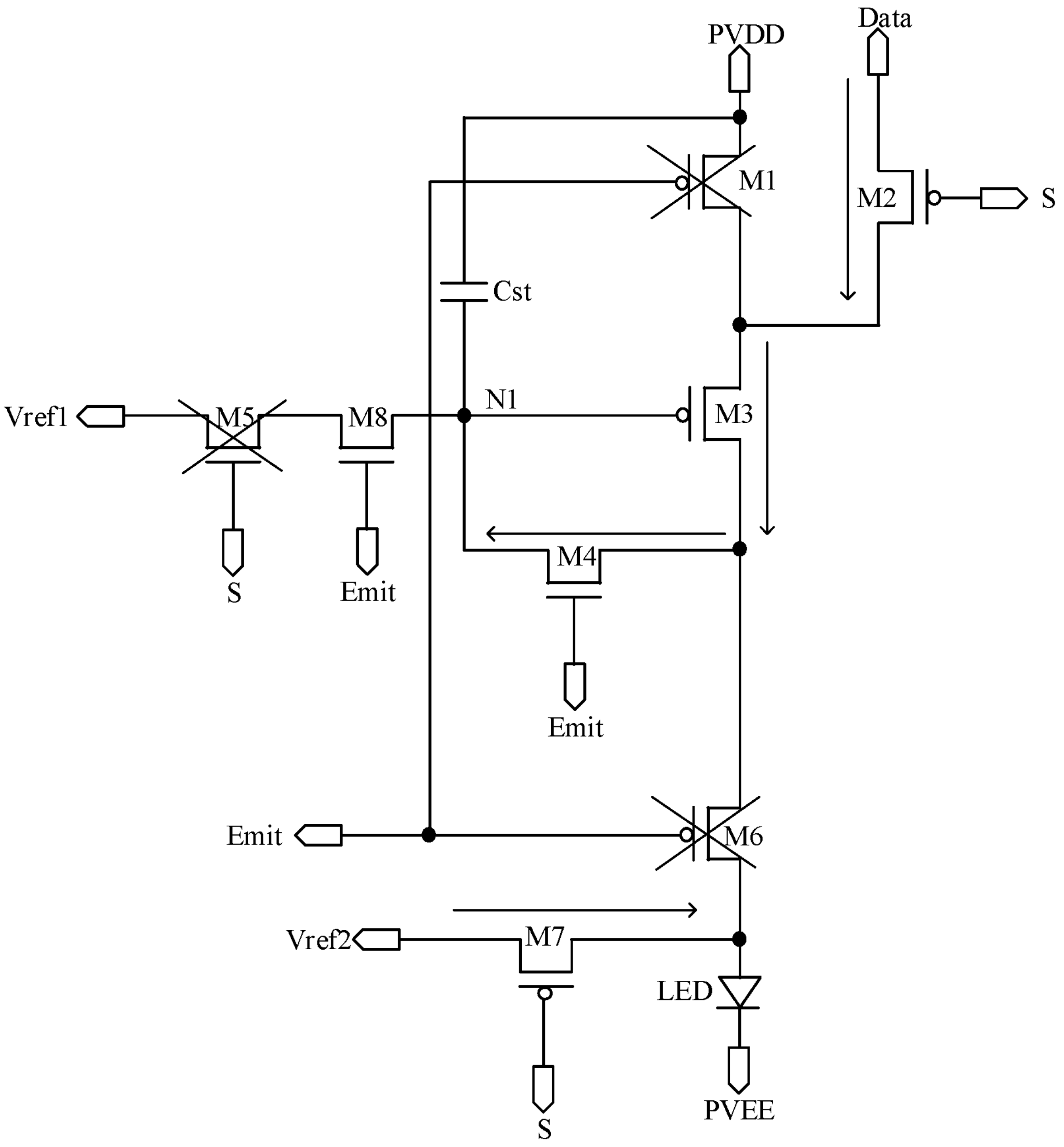
FIG. 9 is a structural diagram of a pixel circuit in a data write stage according to an embodiment of the present disclosure.
Figure 10:
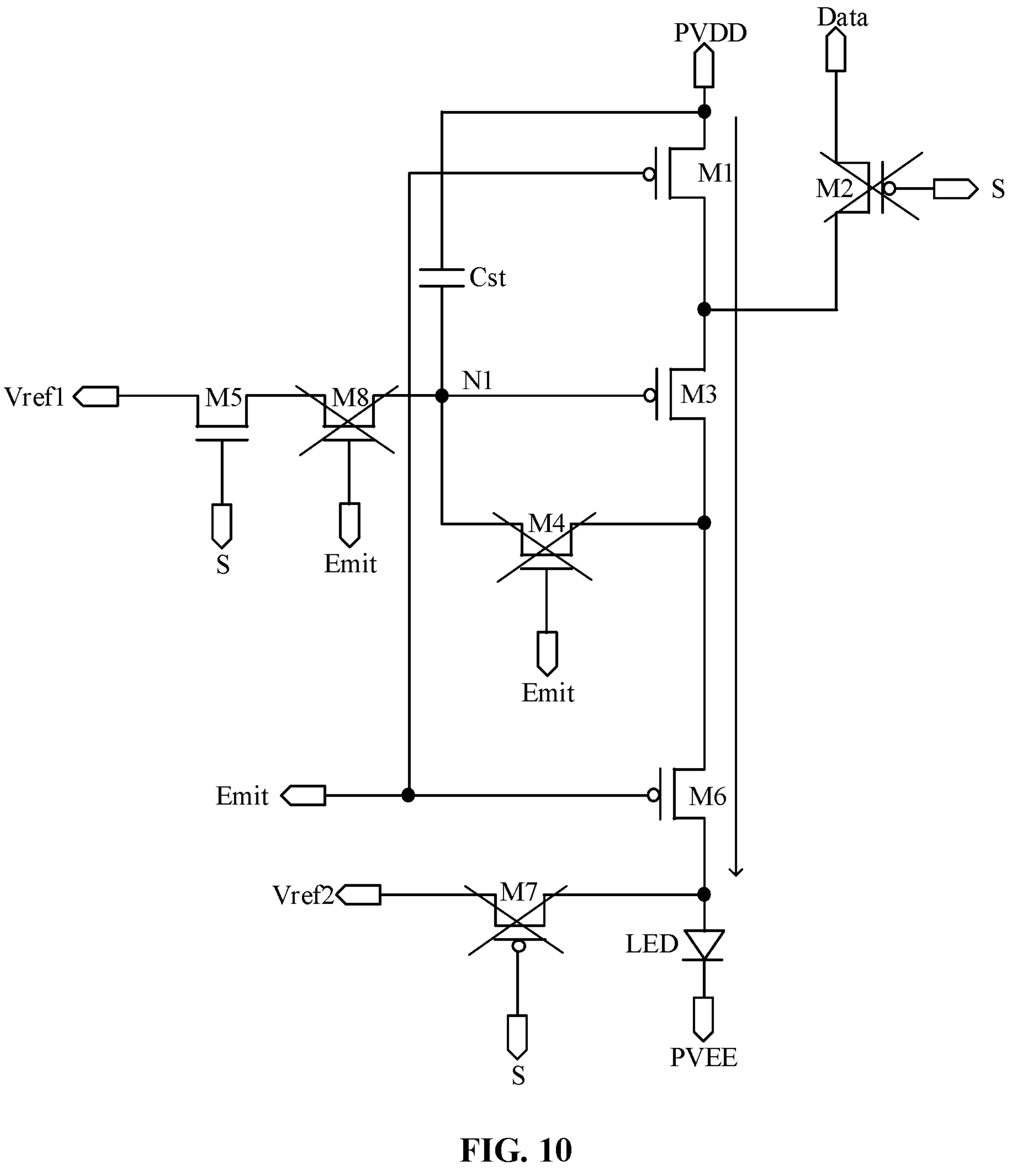
FIG. 10 is a structural diagram of a pixel circuit in a light emission stage according to an embodiment of the present disclosure.

Referring to FIGS. 7 and 9, in a data write stage T2, the control signal outputted by the scan signal terminal S controls the first N-type transistor M5 to be turned off, and the control signal outputted by the enable signal terminal Emit controls the second N-type transistor M8 to be turned on so that the first initialization module is turned off.

In the data write stage T2, the scan signal terminal S outputs a low level, the enable signal terminal Emit outputs a high level, the fourth transistor M2 is turned on under the control of the low level provided by the scan signal terminal S, and the third N-type transistor M4 is turned on under the control of the high level provided by the enable signal terminal Emit. Since in the initialization stage T1, a low level is written into the first node N1, the drive transistor M3 is also in an on state at this time, a data voltage provided by the data signal terminal Data is written into the first node N1 after passing through the fourth transistor M2, the drive transistor M3, and the third N-type transistor M4, and the threshold compensation of a gate of the drive transistor M3 is achieved at the same time. In this stage, the fifth transistor M1 and the sixth transistor M6 are turned off under the control of the high level provided by the enable signal terminal Emit. Although the second N-type transistor M8 is in the on state, the first N-type transistor M5 is turned off under the control of the low level provided by the scan signal terminal S. Therefore, the first initialization module is in an off state. In the data write stage T2, the seventh transistor M7 is turned on under the control of the low level provided by the scan signal terminal S, and a reference voltage provided by the second reference signal terminal Vref2 resets the first electrode of the light-emitting element LED.

Referring to FIGS. 7 and 10, in a light emission stage T3, the control signal outputted by the scan signal terminal S controls the first N-type transistor M5 to be turned on, and the control signal outputted by the enable signal terminal Emit controls the second N-type transistor M8 to be turned off so that the first initialization module is turned off.

In the light emission stage T3, the scan signal terminal S1 outputs a high level, the enable signal terminal Emit outputs a low level, the fifth transistor M1 and the sixth transistor M6 are turned on under the control of the low level provided by the enable signal terminal Emit, the third N-type transistor M4 is turned off under the control of the low level provided by the enable signal terminal Emit, and the current provided by the first power supply voltage terminal PVDD flows through the fifth transistor M1, the drive transistor M3, and the sixth transistor M6 in sequence and into the light-emitting element LED, thereby achieving the display of the light-emitting element. In this stage, although the first N-type transistor M5 is turned on, the second N-type transistor M8 is turned off. Therefore, the first initialization module is turned off, and the seventh transistor M7 is turned off under the control of the high level provided by the scan signal terminal S.

To sum up, in the technical solutions of the embodiments of the present disclosure, only one scan signal terminal and one enable signal terminal are required for driving the corresponding pixel circuit so that a narrower frame of the display panel is achieved.

An embodiment of the present disclosure further provides an array substrate including a display region, where the display region includes multiple pixel circuits provided in any of the preceding embodiments arranged in an array. Since the array substrate provided in the embodiments of the present disclosure includes any one of the pixel circuits provided in the preceding embodiments, the array substrate has the technical effect of a narrow frame.

Figure 11:
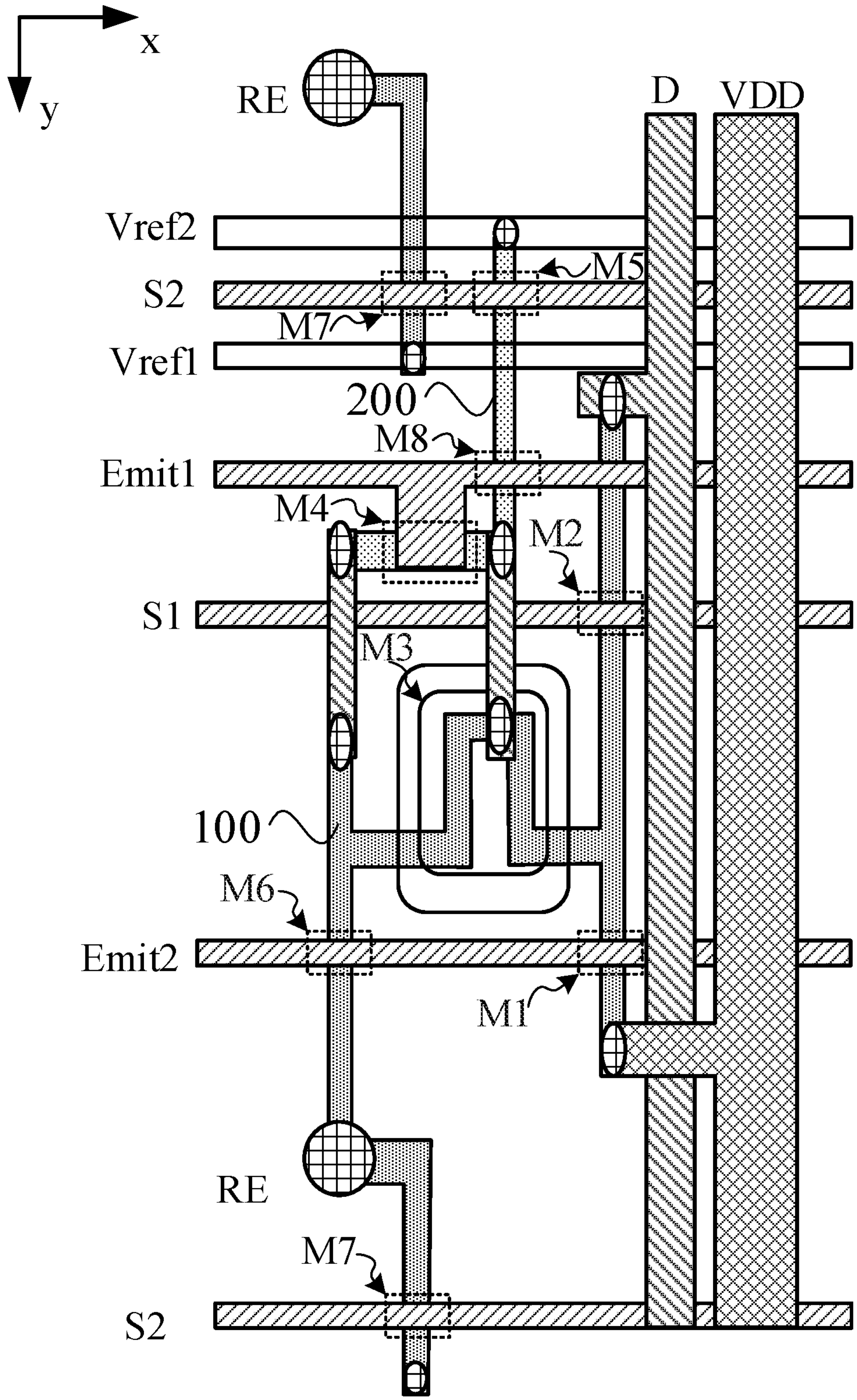
FIG. 11 is a structural diagram of an array substrate of a pixel circuit according to an embodiment of the present disclosure.

FIG. 11 is a structural diagram of an array substrate of a pixel circuit according to an embodiment of the present disclosure. Referring to FIG. 11, optionally, the pixel circuit includes a first scan signal line S1, a second scan signal line S2, a first enable signal line Emit1, and a second enable signal line Emit2 extending along a first direction x. The first enable signal line Emit1 and the second enable signal line Emit2 are located on two sides of the drive module 10, respectively. By way of example, the drive module 10 includes a drive transistor M3. In FIG. 11, the first enable signal line Emit1 is located above the drive transistor M3, and the second enable signal line Emit 2 is located below the drive transistor M3. The first scan signal line S1 is located between the first enable signal line Emit1 and the drive module 10, and the second scan signal line S2 is located on a side of the first enable signal line Emit1 facing away from the drive module 10.

The first scan signal line S1 and the second scan signal line S2 may be connected to a same scan signal terminal (not shown in FIG. 11), and the first enable signal line Emit1 and the second enable signal line Emit2 may be connected to a same enable signal terminal (not shown in FIG. 11) so that only two sets of scan circuits are needed for driving, which is conducive to achieving a narrow frame compared with the related art in which three sets of scan circuits are needed for driving.

With continued reference to FIG. 11, optionally, the pixel circuit further includes a first semiconductor active layer 100 and a second semiconductor active layer 200; the second scan signal line S2 overlaps the second semiconductor active layer 200 so as to form the first N-type transistor M5, the second scan signal line S2 overlaps the first semiconductor active layer 100 so as to form the seventh transistor M7, and an terminal of the seventh transistor M7 is connected to an anode RE of the light-emitting element; the first enable signal line Emit1 overlaps the second semiconductor active layers 200 so as to form the second N-type transistor M8 and the third N-type transistor M4; the first scan signal line S1 overlaps the first semiconductor active layer 100 so as to form the fourth transistor M2; the second enable signal line Emit2 overlaps the first semiconductor active layer 100 so as to form the fifth transistor M1 and the sixth transistor M6.

It is to be understood that a region where the scan signal line or the enable signal line overlaps the corresponding semiconductor active layer forms the gate of the transistor, and other elements are doped on two sides of the gate so as to form the source and drain of the transistor. For the connection between transistors formed by the same type of active layers, heavy doping is performed on the active layers, so as to achieve the conductive function; and for the connection between transistors formed by different types of active layers, connection may be achieved by using metal wires across the layers, which may be designed according to the actual circuit structure and layout during specific implementation.

The first semiconductor active layer 100 includes an LTPS semiconductor active layer, and the second semiconductor active layer 200 includes an oxide semiconductor active layer, such as an IGZO active layer.

With continued reference to FIG. 11, optionally, the pixel circuit further includes a data signal line D and a first power supply voltage signal line VDD extending along a second direction y, where the data signal line D is electrically connected to a first terminal of the fourth transistor M2, the first power supply voltage signal line VDD is electrically connected to a first terminal of the fifth transistor M1, and the second direction y intersects with the first direction x.

The signal lines and the active layers are in different layers, and a through hole may be provided at a corresponding position when connection between the signal lines and the active layers is required. For example, a circular (elliptical) region in FIG. 11 indicates a position of the through hole. The first direction x may be parallel to a row direction of the array formed by the pixel circuits, the second direction y may be parallel to a column direction of the array formed by the pixel circuits, the first scan signal line S1, the second scan signal line S2, the first enable signal line Emit1, and the second enable signal line Emit2 may be located in the same layer in the first direction x, and the data signal line D and the first power supply voltage signal line VDD may be located in the same layer in the second direction y. In other embodiments, the first scan signal line S1 and the second scan signal line S2 may be located in the same layer, the first enable signal line Emit1 and the second enable signal line Emit2 may be located in the same layer, but the first scan signal line S1 and the second scan signal line S2 are located in different layers from the first enable signal line Emit1 and the second enable signal line Emit2, and the data signal line D and the first power supply voltage signal line VDD are located in different layers, which may be designed according to actual conditions during specific implementation. FIG. 11 shows that the data signal line D and the first power supply voltage signal line VDD are located in different layers. If the data signal line D and the first power supply voltage signal line VDD are in the same layer, cross-line processing is performed on an overlapping position of the data signal line D and the first power supply voltage signal line VDD (the connection position of the first power supply voltage signal line VDD and the fifth transistor M1), so as to avoid a short circuit between the two types of signal lines.

Optionally, the first semiconductor active layer and the second semiconductor active layer are electrically connected through a metal wire, where the metal wire is in a same layer as the data signal line or the first power supply voltage signal line.

Since the first semiconductor layer and the second semiconductor layer have different materials and are generally arranged in different layers, the first semiconductor layer and the second semiconductor layer cannot be directly electrically connected, so a connecting wire needs to be provided. FIG. 11 schematically shows that the first semiconductor active layer 100 and the second semiconductor active layer 200 are connected through a metal wire 300 in the same layer as the data signal line, so as to achieve the connection between the drive transistor M3 and the third N-type transistor M4. In other embodiments, the metal wire may also be in the same layer as the first power supply voltage signal line or in the same layer as other signal lines in the pixel circuit, but it must be ensured that the metal wire is insulated from the first scan signal line S1.

In this embodiment, the types of the first N-type transistor M5 and the seventh transistor M7 are different. To avoid direct connection between active layers of the first N-type transistor M5 and the seventh transistor M7, a first reference signal line ref1 and a second reference signal line ref2 are provided and connected to the first reference signal terminal Vref1 and the second reference signal terminal Vref2, respectively.

Figure 12:
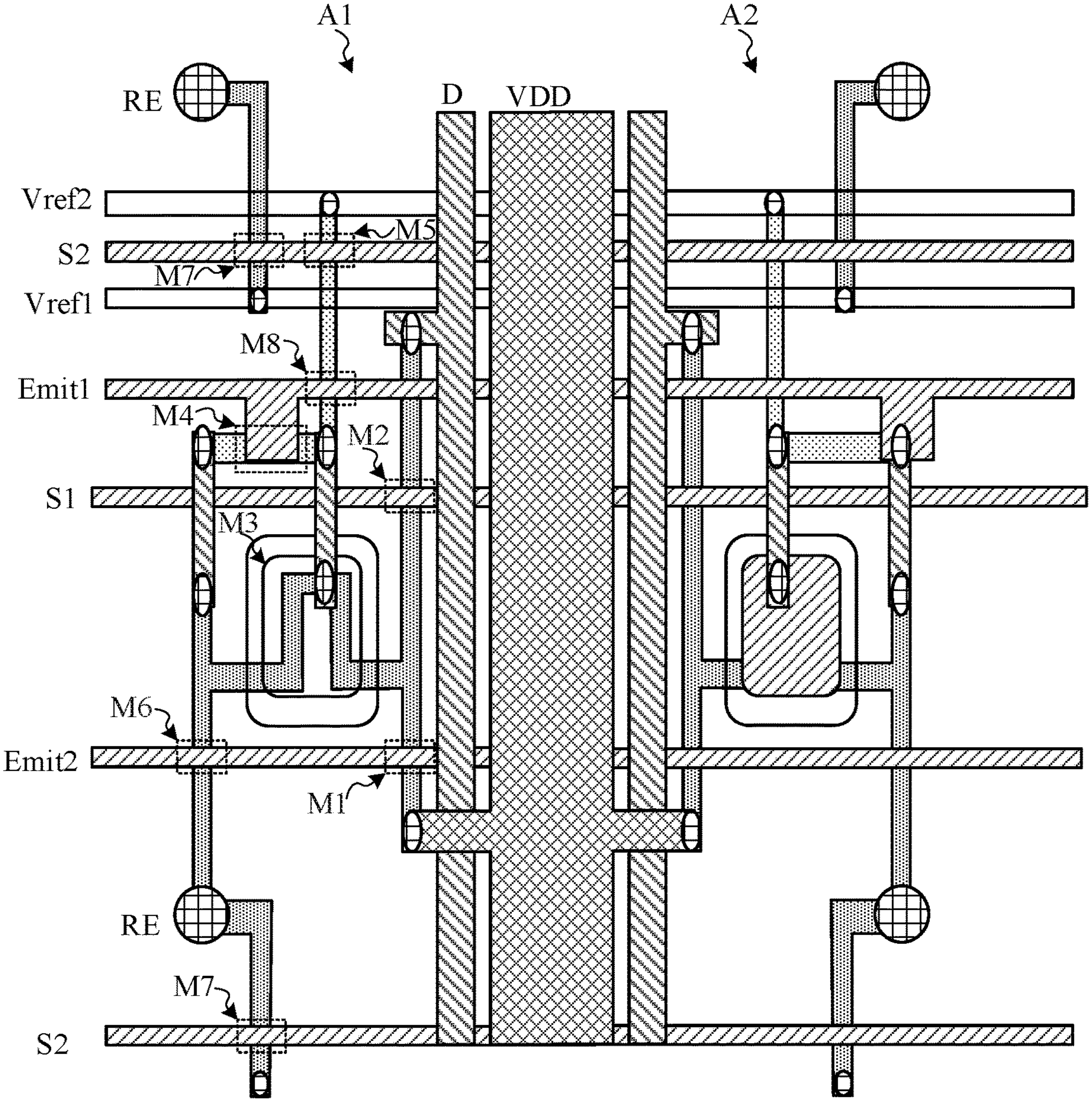
FIG. 12 is a structural diagram of an array substrate of another pixel circuit according to an embodiment of the present disclosure.

FIG. 12 is a structural diagram of an array substrate of another pixel circuit according to an embodiment of the present disclosure. Referring to FIG. 12, optionally, the pixel circuit includes a first pixel circuit A1 and a second pixel circuit A2, where the first pixel circuit A1 and the second pixel circuit A2 share a same power supply voltage signal line VDD, and the first pixel circuit A1 and the second pixel circuit A2 are arranged symmetrically along the power supply voltage signal line VDD.

The first pixel circuit A1 and the second pixel circuit A2 are arranged symmetrically along the power supply voltage signal line VDD, which is conducive to reducing the number of power supply voltage signal lines VDD and simplifying the circuit structure. Moreover, a width of the power supply voltage signal line VDD is larger, which is conducive to reducing the resistance and the voltage drop.

Figure 13:
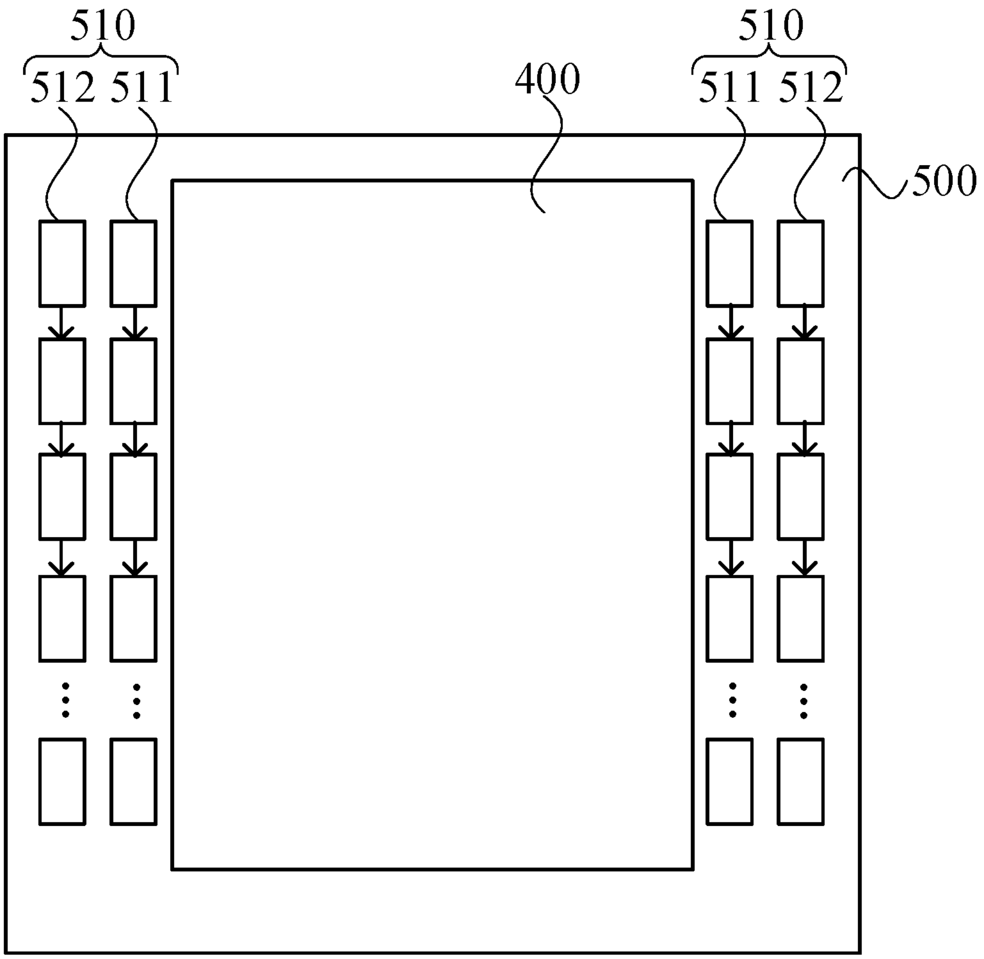
FIG. 13 is a structural diagram of an array substrate according to an embodiment of the present disclosure.

FIG. 13 is a structural diagram of an array substrate according to an embodiment of the present disclosure. Referring to FIG. 13, optionally, the array substrate includes a display region 400 and a frame region 500 surrounding the display region, where the display region includes multiple pixel circuits (not shown in FIG. 13) arranged in an array, and the frame region 500 includes a shift register circuit 510, where the shift register circuit 510 includes multiple cascaded first shift registers 511 and multiple cascaded second shift registers 512, an output terminal of the first shift register 511 is the scan signal end S (not shown in FIG. 13), and an output terminal of the second shift register 512 is the enable signal terminal Emit (not shown in FIG. 13).

The first shift register 511 and the second shift register 512 are both shift registers including multiple transistors and capacitors and are configured to provide control signals required by the gates of the transistors in the pixel circuit so as to control the on and off of corresponding transistors. The specific circuit structure may be selected according to actual conditions, which is not limited in the embodiments of the present disclosure. The position of the first shift register 511 on a side of the second shift register 512 closer to the display region 400 is merely illustrative, and the order of the first shift register 511 and the second shift register 512 is not limited in the embodiments of the present disclosure. In this embodiment, it is schematically shown that the shift register circuit 510 is located on left and right frames of the array substrate. In other embodiments, only one frame may be provided, or the first shift register 511 and the second shift register 512 may be are located on different frames.

The pixel circuit provided in the embodiments of the present disclosure includes two scan signal lines (the first scan signal line S1 and the second scan signal line S2 as shown in FIG. 11) and two enable signal lines (the first enable signal line Emit1 and the second enable signal line Emit2 as shown in FIG. 11). In this embodiment, the output terminal of the first shift register 511 is divided into two and connected to two scan signal lines respectively, and the output terminal of the second shift register 512 is divided into two and connected to two enable signal lines respectively. During specific implementation, the same first shift register 511 may be connected to two scan signal lines in the same row of pixel circuits or may be connected to two scan signal lines in different rows of pixel circuits, and the same second shift register 512 may be connected to two enable signal lines in the same row of pixel circuits or may be connected to two enable signal lines in different rows of pixel circuits.

Optionally, the array substrate includes n rows of pixel circuits, and pixel circuits in each row is connected by a first scan signal line and a second scan signal line; the first shift registers include n stages of first sub-shift registers located in a first frame region and n stages of second sub-shift registers located in a second frame region; an output terminal of a first sub-shift register of an i-th stage is connected to both the first scan signal line and the second scan signal line in a pixel circuit in an i-th row, and an output terminal of a second sub-shift register of an i-th stage is connected to both the first scan signal line and the second scan signal line in a pixel circuit in the i-th row, where $0<i\leq n$, $n\geq 2$, and i and n are both integers.

Optionally, the array substrate includes n rows of pixel circuits, and pixel circuits in each row are connected by a first scan signal line and a second scan signal line; the first shift registers include n stages of first sub-shift registers located in a first frame region and n stages of second sub-shift registers located in a second frame region; an output terminal of a first sub-shift register of an i-th stage is connected to both the second scan signal line in a pixel circuit in an i-th row and the first scan signal line in a pixel circuit in an (i+j)-th row, and an output terminal of a second sub-shift register of an i-th stage is connected to both the second scan signal line in a pixel circuit in the i-th row and the first scan signal line in a pixel circuit in the (i+j)-th row, where 0<i≤n, and 0<j≤n−i; and i, j, and n are all integers.

Optionally, pixel circuits in each row are connected to by a first enable signal line and a second enable signal line; the second shift registers include n stages of third sub-shift registers located in the first frame region and n stages of fourth sub-shift registers located in the second frame region; an output terminal of a third sub-shift register of an i-th stage is connected to both the first enable signal line and the second enable signal line in a pixel circuit in the i-th row, and an output terminal of a fourth sub-shift register of an i-th stage is connected to both the first enable signal line and the second enable signal line in a pixel circuit in the i-th row, where 0<i≤n, n≥2, and i and n are both integers.

Optionally, pixel circuits in each row are connected by a first enable signal line and a second enable signal line; the second shift register includes n stages of third sub-shift registers located in the first frame region and n stages of fourth sub-shift registers located in the second frame region; an output terminal of a third sub-shift register of an i-th stage is connected to both the first enable signal line in a pixel circuit in the i-th row and the second enable signal line in a pixel circuit in the (i+j)-th row, and an output terminal of a fourth sub-shift register of an i-th stage is connected to both the first enable signal line in a pixel circuit in the i-th row and the second enable signal line in a pixel circuit in the (i+j)-th row, where 0<i≤n, and 0<j≤n−i; and i, j, and n are all integers.

Figure 14:
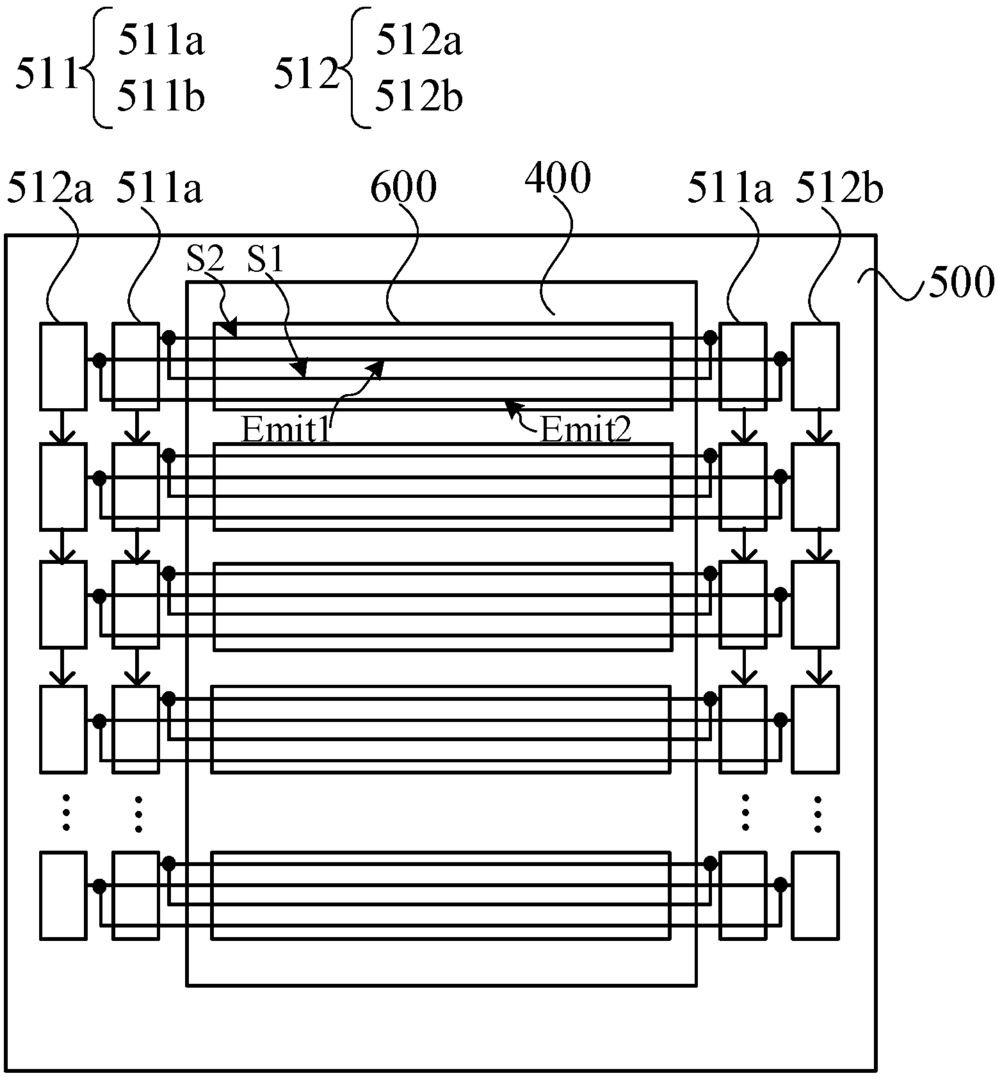
FIGS. 14 to 17 are structural diagrams of other array substrates according to embodiments of the present disclosure.

By way of example, FIGS. 14 to 17 are structural diagrams of other array substrates according to embodiments of the present disclosure. Referring to FIGS. 14 to 17, the array substrate includes n rows of pixel circuits 600, where each pixel circuit in each row is connected to each other by the first scan signal line S1, the second scan signal line S2, the first enable signal line Emit1, and the second enable signal line Emit2. The first shift register 511 includes a first sub-shift register 511*a* and a second sub-shift register 511*b*, and the second shift register 512 includes a third sub-shift register 512*a* and a fourth sub-shift register 512*b*. Referring to FIG. 14, the first scan signal line S1 and the second scan signal line S2 in the pixel circuit in each row are connected to the first sub-shift register 511*a* and the second sub-shift register 511*b* in the corresponding row, that is, the first sub-shift register 511*a* of the first stage and the second sub-shift register 511*b* of the first stage are connected to the first scan signal line S1 and the second scan signal line S2 in the pixel circuit in the first row, and the first sub-shift register 511*a* of the second stage and the second sub-shift register 511*b* of the second stage are connected to the first scan signal line S1 and the second scan signal line S2 in the pixel circuit in the second row. By such analogy, the first sub-shift register 511*a* of an n-th stage and the second sub-shift register 511*b* of the n-th stage are connected to the first scan signal line S1 and the second scan signal line S2 in the pixel circuit in an n-th row. The first enable signal line Emit1 and the second enable signal line Emit2 in each pixel circuit in each row are connected to both the third sub-shift register 512*a* and the fourth sub-shift register 512*b* in the corresponding row, that is, the third sub-shift register 512*b* of the first stage and the fourth sub-shift register 512*b* of the first stage are connected to the first enable signal line Emit1 and the second enable signal line Emit2 in the pixel circuit in the first row, the third sub-shift register 512*a* of the second stage and the fourth sub-shift register 512*b* of the second stage are connected to the first enable signal line Emit1 and the second enable signal line Emit2 in the pixel circuit in the second row, and the third sub-shift register 512*a* of the third stage and the four sub-shift register 512*b* of the third stage are connected to the first enable signal line Emit1 and the second enable signal line Emit2 in the pixel circuit in the third row. By such analogy, the third sub-shift register 512*a* of an n-th stage and the fourth sub-shift register 512*b* of the n-th stage are connected to the first enable signal line Emit1 and the second enable signal line Emit2 in the pixel circuit in an n-th row.

Figure 15:
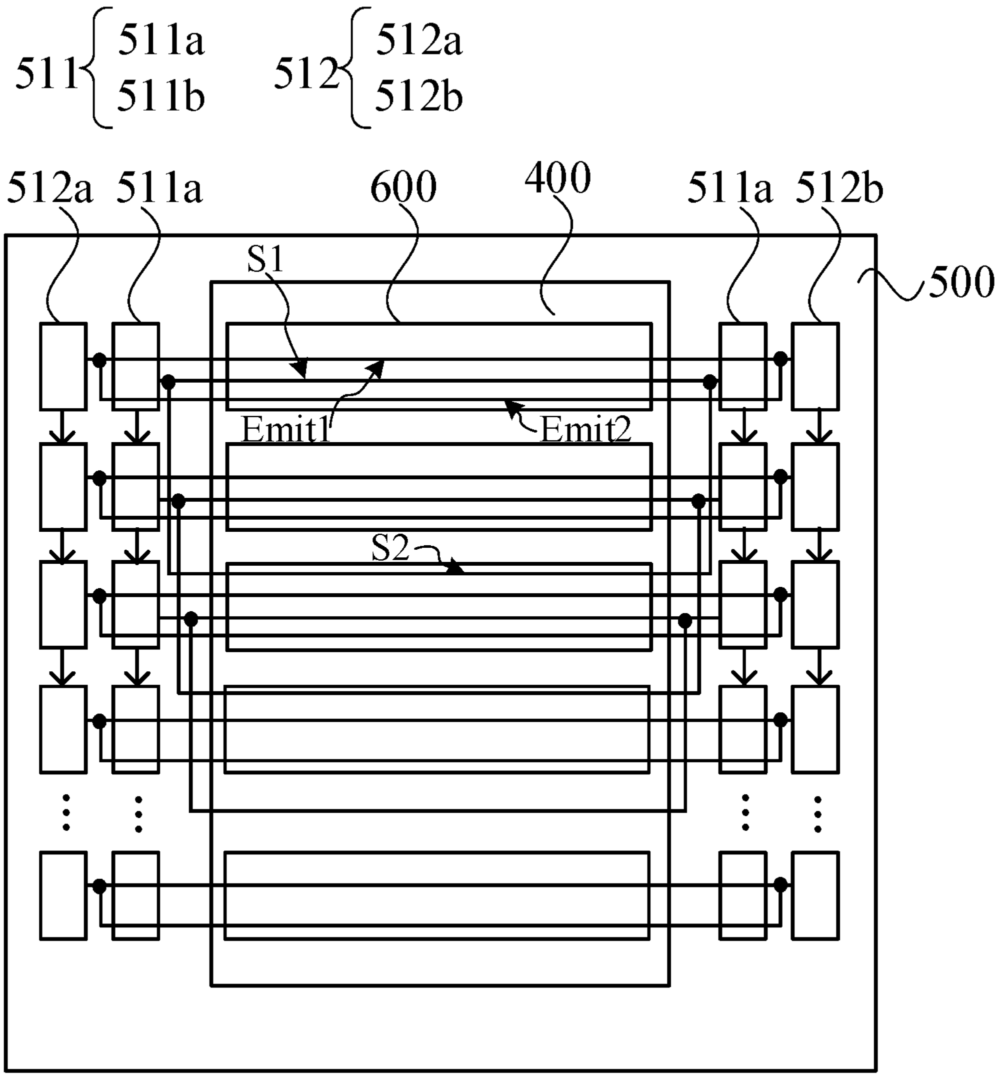

Referring to FIG. 15, j=2 is used as an example, the first sub-shift register 511*a* of the first stage and the second sub-shift register 511*b* of the first stage are connected to the first scan signal line S1 in the pixel circuit in the first row and the second scan signal line S2 in the pixel circuit in the third row, the first sub-shift register 511*a* of the second stage and the second sub-shift register 511*b* of the second stage are connected to the first scan signal line S1 in the pixel circuit in the second row and the second scan signal line S2 in the pixel circuit in the fourth row, and so on. It is to be noted that the control signal of the second scan signal line S2 in the pixel circuit in the first row may be provided by a redundant shift register set before the first sub-shift register 511*a* of the first stage, and some of connecting lines are not shown in the figure. The connection manner of the first enable signal line Emit1 and the second enable signal line Emit2 is the same as that in FIG. 14 and is not described in detail here.

Figure 16:
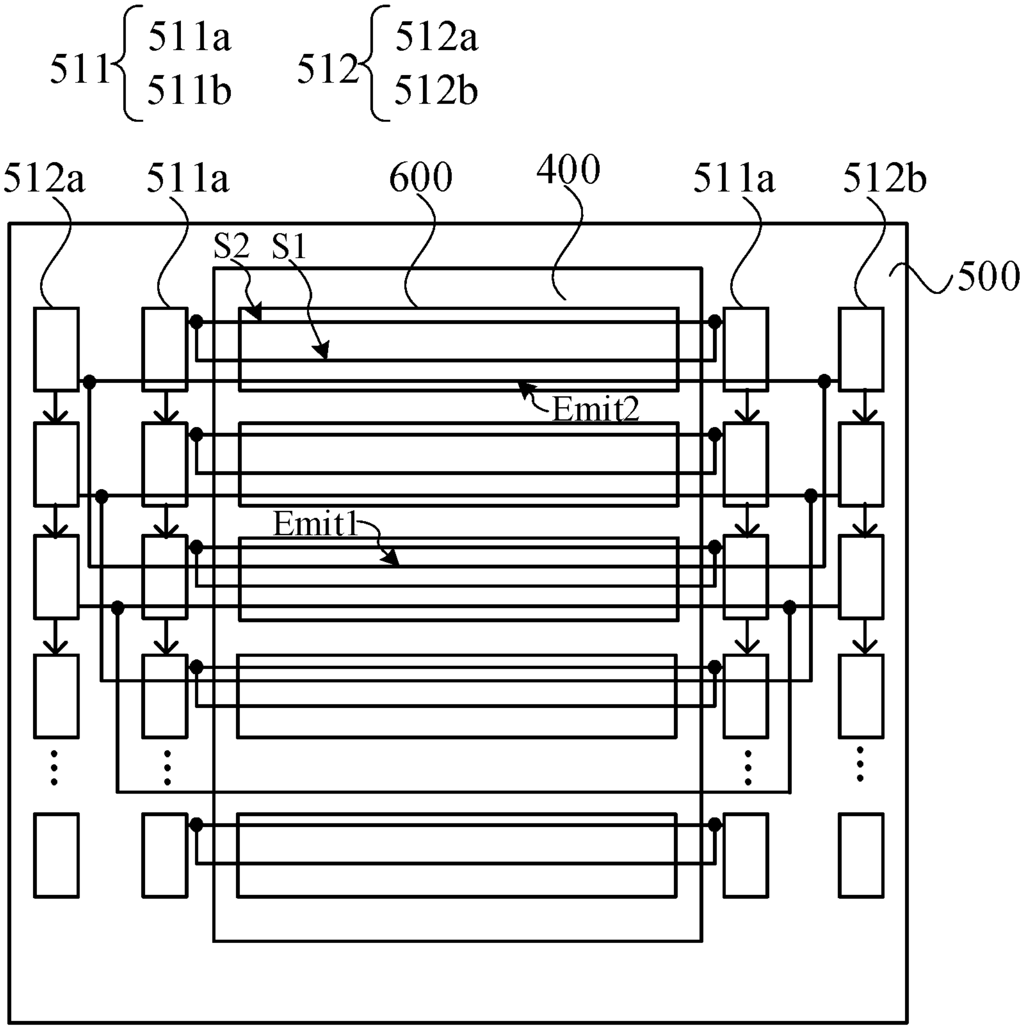

Referring to FIG. 16, j=2 is used as an example, the third sub-shift register 512*a* of the first stage and the fourth sub-shift register 512*b* of the first stage are connected to the second enable signal line Emit2 in the pixel circuit in the first row and the first enable signal line Emit1 in the pixel circuit in the third row, the third sub-shift register 512*a* of the second stage and the fourth sub-shift register 512*b* of the second stage are connected to the second enable signal line Emit2 in the pixel circuit in the second row and the first enable signal line Emit1 in the pixel circuit in the fourth row, and so on. It is to be noted that the control signal of the first enable signal line Emit1 in the pixel circuit in the first row may be provided by a redundant shift register set before the third sub-shift register 512*a* of the first stage, and some of connecting lines are not shown in the figure. The connection manner of the first scan signal line S1 and the second scan signal line S2 is the same as that in FIG. 14 and is not described in detail here.

Figure 17:
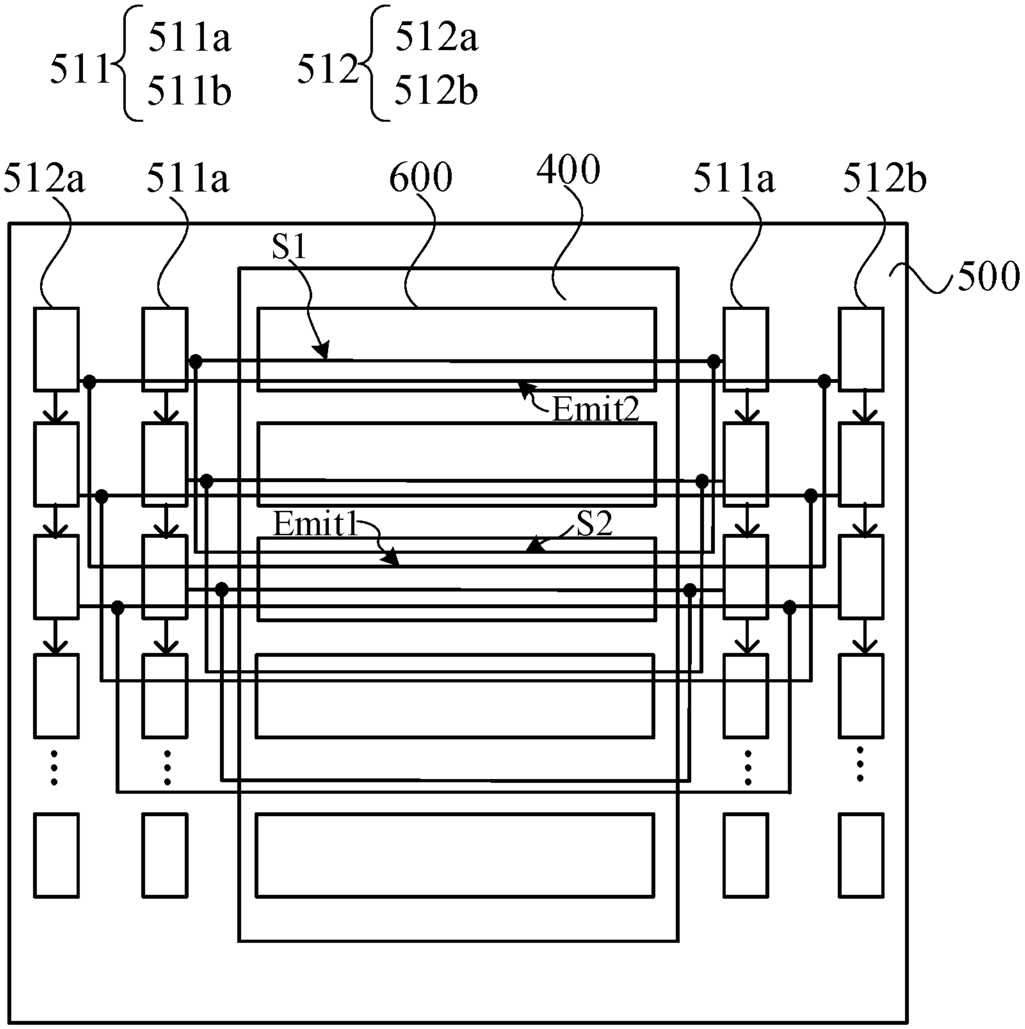

Referring to FIG. 17, j=2 is still used as an example, the connection manner of the first scan signal line S1 and the second scan signal line S2 is the same as that in FIG. 15, and the connection manner of the first enable signal line Emit1 and the second enable signal line Emit2 is the same as that is FIG. 16.

It is to be noted that, when the array substrate provided in the embodiments of the present disclosure drives the pixel circuits, a single-side driving method or a double-side driving method may be adopted. For example, when the scan signal lines are driven, the first sub-shift register and the second sub-shift register provide signals to the corresponding scan signal lines from two sides at the same time, which is the double-side driving; and while the first sub-shift register provides signals to one of the scan signal lines from the left side, the second sub-shift register provides signals to another scan signal line from the right side, which is the single-side driving method. The signal driving method is not limited in the embodiments of the present disclosure.

An embodiment of the present disclosure further provides a display panel including any one of the array substrates provided in the preceding embodiments. The display panel has the technical effect of a narrow frame.

Figure 18:
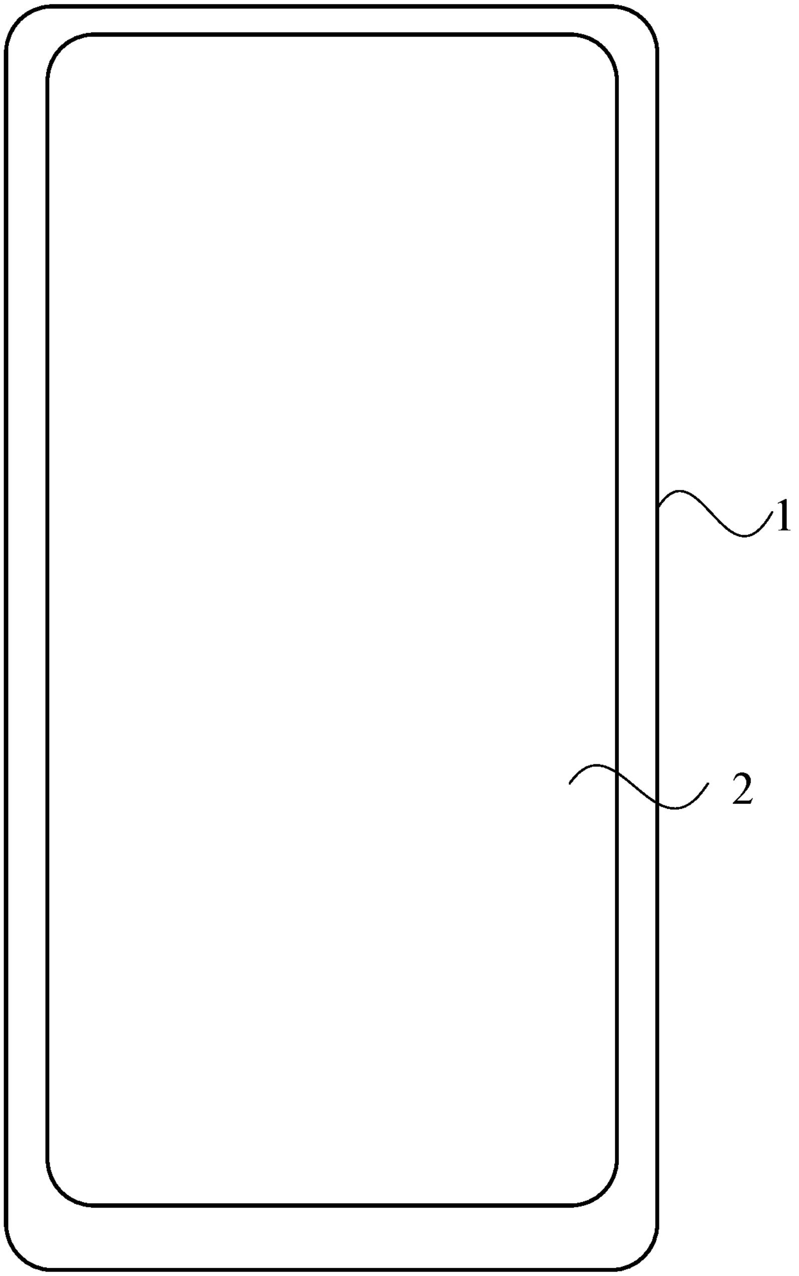
FIG. 18 is a structural diagram of a display device according to an embodiment of the present disclosure.

FIG. 18 is a structural diagram of a display device according to an embodiment of the present disclosure. Referring to FIG. 18, a display device 1 includes any one of display panels 2 provided in the embodiments of the present disclosure. The display device 1 may be a mobile phone, a computer, an intelligent wearable device, and the like.

It is to be noted that the preceding are only preferred embodiments of the present disclosure and technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A pixel circuit, comprising:

a drive module, wherein a control terminal of the drive module is electrically connected to a first node, a first terminal of the drive module is electrically connected to a first power supply voltage terminal, and a second terminal of the drive module is electrically connected to a first electrode of a light-emitting element;

a first initialization module, wherein the first initialization module comprises a first N-type transistor and a second N-type transistor, wherein a control terminal of the first N-type transistor is electrically connected to a scan signal terminal, a first terminal of the first N-type transistor is electrically connected to a first reference signal terminal, a second terminal of the first N-type transistor is electrically connected to a first terminal of the second N-type transistor, a control terminal of the second N-type transistor is electrically connected to an enable signal terminal, and a second terminal of the second N-type transistor is electrically connected to the first node; and a data write module, wherein a control terminal of the data write module is electrically connected to the scan signal terminal, a first terminal of the data write module is electrically connected to a data signal terminal, and a second terminal of the data write module is electrically connected to the first terminal of the drive module;

wherein the pixel circuit further comprises a first scan signal line, a second scan signal line, a first enable signal line, and a second enable signal line which are extend along a first direction; and the first enable signal line and the second enable signal line are located on two sides of the drive module, respectively, the first scan signal line is located between the first enable signal line and the drive module, and the second scan signal line is located on a side of the first enable signal line facing away from the drive module.

2. The pixel circuit of claim 1, further comprising:

a threshold compensation module, wherein the threshold compensation module comprises a third N-type transistor, wherein a control terminal of the third N-type transistor is electrically connected to the enable signal terminal, a first terminal of the third N-type transistor is electrically connected to the second terminal of the drive module, and a second terminal of the third N-type transistor is electrically connected to the first node.

3. The pixel circuit of claim 2, wherein each of the first N-type transistor, the second N-type transistor, and the third N-type transistor is a transistor comprising an oxide semiconductor.

4. The pixel circuit of claim 2, further comprising at least one of:

a storage module, wherein a first terminal of the storage module is electrically connected to the first power supply voltage terminal, and a second terminal of the storage module is electrically connected to the first node;

a second initialization module, wherein a control terminal of the second initialization module is electrically connected to the scan signal terminal, a first terminal of the second initialization module is electrically connected to a second reference signal terminal, and a second terminal of the second initialization module is electrically connected to the first electrode of the light-emitting element;

a first light emission control module, wherein a control terminal of the first light emission control module is electrically connected to the enable signal terminal, a first terminal of the first light emission control module is electrically connected to the first power supply voltage terminal, and a second terminal of the first light emission control module is electrically connected to the first terminal of the drive module; or a second light emission control module, wherein a control terminal of the second light emission control module is electrically connected to the enable signal terminal, a first terminal of the second light emission control module is electrically connected to the second terminal of the drive module, a second terminal of the second light emission control module is electrically connected to the first electrode of the light-emitting element, and a second electrode of the light-emitting element is electrically connected to a second power supply voltage terminal.

5. The pixel circuit of claim 4, wherein the drive module comprises a drive transistor, the data write module comprises a fourth transistor, the first light emission control module comprises a fifth transistor, the second light emission control module comprises a sixth transistor, the second initialization module comprises a seventh transistor, and the storage module comprises a first capacitor;

a control terminal of the fifth transistor is electrically connected to the enable signal terminal, a first terminal of the fifth transistor is electrically connected to the first power supply voltage terminal, and a second terminal of the fifth transistor is electrically connected to a first terminal of the drive transistor;

a control terminal of the drive transistor is electrically connected to the first node, and a second terminal of the drive transistor is electrically connected to a first terminal of the sixth transistor;

a control terminal of the fourth transistor is electrically connected to the scan signal terminal, a first terminal of the fourth transistor is electrically connected to the data signal terminal, and a second terminal of the fourth transistor is electrically connected to the first terminal of the drive transistor;

a control terminal of the sixth transistor is electrically connected to the enable signal terminal, and a second terminal of the sixth transistor is electrically connected to the first electrode of the light-emitting element;

a control terminal of the seventh transistor is electrically connected to the scan signal terminal, a first terminal of the seventh transistor is electrically connected to the second reference signal terminal, and a second terminal of the seventh transistor is electrically connected to the first electrode of the light-emitting element; and a first terminal of the first capacitor is electrically connected to the first node, and a second terminal of the first capacitor is electrically connected to the first power supply voltage terminal.

6. The pixel circuit of claim 5, wherein each of the drive transistor, the fourth transistor, the fifth transistor, the fifth transistor, the sixth transistor, and the seventh transistor is a P-type transistor.

7. The pixel circuit of claim 6, wherein the P-type transistor is a transistor comprising a low temperature polysilicon semiconductor.

8. A driving method of a pixel circuit, which is used for driving the pixel circuit of claim 1, comprising:

in an initialization stage, controlling the first initialization module to be turned on, controlling the data write module and the drive module to be turned off, and initializing, by the first initialization module, a potential of the first node;

in a data write stage, controlling the data write module and the drive module to be turned on, controlling the first initialization module to be turned off, and writing, by the data write module, a data signal into the first node; and in a light emission stage, controlling the drive module to be turned on, controlling the data write module and the first initialization module to be turned off, providing, by the drive module, a drive current to a light-emitting element, and emitting, by the light-emitting element, light in response to the drive current.

9. The driving method of claim 8, wherein the first initialization module comprises a first N-type transistor and a second N-type transistor, wherein a control terminal of the first N-type transistor is electrically connected to a scan signal terminal, a control terminal of the second N-type transistor is electrically connected to an enable signal terminal; wherein the driving method further comprises:

in the initialization stage, controlling, by a control signal outputted by the scan signal terminal, the first N-type transistor to be turned on, and controlling, by a control signal outputted by the enable signal terminal, the second N-type transistor to be turned on so that the first initialization module is turned on;

in the data write stage, controlling, by the control signal outputted by the scan signal terminal, the first N-type transistor to be turned off, and controlling, by the control signal outputted by the enable signal terminal, the second N-type transistor to be turned on so that the first initialization module is turned off; and in the light emission stage, controlling, by the control signal outputted by the scan signal terminal, the first N-type transistor to be turned on, and controlling, by the control signal outputted by the enable signal terminal, the second N-type transistor to be turned off so that the first initialization module is turned off.

10. The driving method of claim 9, wherein a control terminal of the data write module is electrically connected to the scan signal terminal, the control signal outputted by the scan signal terminal controls the data write module to be turned on in the data write stage and turned off in the initialization stage and the light emission stage.

11. The driving method of claim 8, wherein the pixel circuit further comprises a threshold compensation module, the drive module comprises a drive transistor, and the driving method further comprises:

in the data write stage, controlling the data write module, the drive module, and the threshold compensation module to be turned on, controlling the first initialization module to be turned off, writing, by the data write module, the data signal into the first node, and performing threshold compensation on the drive transistor.

12. The driving method of claim 11, wherein the threshold compensation module comprises a third N-type transistor, a control terminal of the third N-type transistor is electrically connected to an enable signal terminal, and an output signal of the enable signal terminal controls the third N-type transistor to be turned on in the initialization stage and the data write stage and turned off in the light emission stage.

13. The driving method of claim 8, wherein the pixel circuit further comprises at least one of a second initialization module, a first light emission control module or a second light emission control module, and the driving method further comprises:

in the data write stage, controlling the second initialization module to be turned on and initializing, by the second initialization module, a potential of a first electrode of the light-emitting element; and in the light emission stage, controlling the first light emission control module and the second light emission control module to be turned on.

14. The driving method of claim 13, wherein a control terminal of the second initialization module is electrically connected to a scan signal terminal, and a control terminal of the first light emission control module and a control terminal of the second light emission control module are both connected to an enable signal terminal;

an output signal of the scan signal terminal controls the second initialization module to be turned on in the data write stage and turned off in the initialization stage and the light emission stage; and an output signal of the enable signal terminal controls the first light emission control module and the second light emission control module to be turned on in the light emission stage and turned off in the initialization stage and the data write stage.

15. An array substrate, comprising a display region, wherein the display region comprises a plurality of pixel circuits arranged in an array and a pixel circuit of the plurality of pixel circuits comprises:

a drive module, wherein a control terminal of the drive module is electrically connected to a first node, a first terminal of the drive module is electrically connected to a first power supply voltage terminal, and a second terminal of the drive module is electrically connected to a first electrode of a light-emitting element;

a first initialization module, wherein the first initialization module comprises a first N-type transistor and a second N-type transistor, wherein a control terminal of the first N-type transistor is electrically connected to a scan signal terminal, a first terminal of the first N-type transistor is electrically connected to a first reference signal terminal, a second terminal of the first N-type transistor is electrically connected to a first terminal of the second N-type transistor, a control terminal of the second N-type transistor is electrically connected to an enable signal terminal, and a second terminal of the second N-type transistor is electrically connected to the first node; and a data write module, wherein a control terminal of the data write module is electrically connected to the scan signal terminal, a first terminal of the data write module is electrically connected to a data signal terminal, and a second terminal of the data write module is electrically connected to the first terminal of the drive module;

wherein each of the plurality of pixel circuits comprises a first scan signal line, a second scan signal line, a first enable signal line, and a second enable signal line which are extend along a first direction; and the first enable signal line and the second enable signal line are located on two sides of the drive module, respectively, the first scan signal line is located between the first enable signal line and the drive module, and the second scan signal line is located on a side of the first enable signal line facing away from the drive module.

16. The array substrate of claim 15, wherein each of the plurality of pixel circuits further comprises a first semiconductor active layer and a second semiconductor active layer;

the second scan signal line overlaps the second semiconductor active layer to form a first N-type transistor, and the second scan signal line overlaps the first semiconductor active layer to form a seventh transistor;

the first enable signal line overlaps the second semiconductor active layer to form a second N-type transistor and a third N-type transistor;

the first scan signal line overlaps the first semiconductor active layer to form a fourth transistor; and the second enable signal line overlaps the first semiconductor active layer to form a fifth transistor and a sixth transistor.

17. The array substrate of claim 16, wherein the pixel circuit further comprises a data signal line and a first power supply voltage signal line which extend along a second direction, the data signal line is electrically connected to a first terminal of the fourth transistor, the first power supply voltage signal line is electrically connected to a first terminal of the fifth transistor, and the second direction intersects with the first direction.

18. The array substrate of claim 17, wherein the first semiconductor active layer and the second semiconductor active layer are electrically connected through a metal wire, wherein the metal wire is disposed in a same layer as the data signal line or the first power supply voltage signal line.

19. The array substrate of claim 16, wherein the first semiconductor active layer comprises a low temperature polysilicon semiconductor active layer, and the second semiconductor active layer comprises an oxide semiconductor active layer.

20. The array substrate of claim 15, wherein the pixel circuit comprises a first pixel circuit and a second pixel circuit, wherein the first pixel circuit and the second pixel circuit share a same power supply voltage signal line, and the first pixel circuit and the second pixel circuit are arranged symmetrically along the power supply voltage signal line.

21. The array substrate of claim 15, further comprising a frame region surrounding the display region, wherein the frame region comprises a shift register circuit, the shift register circuit comprises a plurality of first shift registers cascaded and a plurality of second shift registers cascaded, an output terminal of each of the plurality of first shift registers is the scan signal terminal, and an output terminal of each of the plurality of second shift registers is the enable signal terminal.

22. The array substrate of claim 21, wherein the array substrate comprises n rows of pixel circuits, and pixel circuits in each row are connected by a first scan signal line and a second scan signal line;

the plurality of first shift registers comprise n stages of first sub-shift registers located in a first frame region and n stages of second sub-shift registers located in a second frame region; and an output terminal of a first sub-shift register of an i-th stage is connected to both the first scan signal line and the second scan signal line in a pixel circuit in an i-th row, and an output terminal of a second sub-shift register of an i-th stage is connected to both the first scan signal line and the second scan signal line in a pixel circuit in the i-th row;

wherein $0<i\leq n$, $n\geq 2$, and each of i and n is an integer.

23. The array substrate of claim 22, wherein each of the plurality of pixel circuits in each row is connected to each other by a first enable signal line and a second enable signal line;

the plurality of second shift registers comprise n stages of third sub-shift registers located in the first frame region and n stages of fourth sub-shift registers located in the second frame region; and an output terminal of a third sub-shift register of an i-th stage is connected to both the first enable signal line and the second enable signal line in a pixel circuit in the i-th row, and an output terminal of a fourth sub-shift register of an i-th stage is connected to both the first enable signal line and the second enable signal line in a pixel circuit in the i-th row;

wherein $0<i\leq n$, $n\geq 2$, and each of i and n is an integer.

24. The array substrate of claim 22, wherein pixel circuits in each row are connected by a first enable signal line and a second enable signal line;

the plurality of second shift registers comprise n stages of third sub-shift registers located in the first frame region and n stages of fourth sub-shift registers located in the second frame region; and an output terminal of a third sub-shift register of an i-th stage is connected to both the first enable signal line in a pixel circuit in the i-th row and the second enable signal line in a pixel circuits in the (i+j)-th row, and an output terminal of a fourth sub-shift register of an i-th stage is connected to both the first enable signal line in a pixel circuit in the i-th row and the second enable signal line in a pixel circuit in the (i+j)-th row;

wherein $0<i\leq n$, and $0<j\leq n-i$; and each of i, j, and n is an integer.

25. The array substrate of claim 21, wherein the array substrate comprises n rows of pixel circuits, and pixel circuits in each row are connected by a first scan signal line and a second scan signal line;

the plurality of first shift registers comprise n stages of first sub-shift registers located in a first frame region and n stages of second sub-shift registers located in a second frame region; and an output terminal of a first sub-shift register of an i-th stage is connected to both the second scan signal line in a pixel circuit in an i-th row and the first scan signal line in a pixel circuit in an (i+j)-th row, and an output terminal of a second sub-shift register of an i-th stage is connected to both the second scan signal line in a pixel circuit in the i-th row and the first scan signal line in a pixel circuit in the (i+j)-th row;

wherein $0<i\leq n$, and $0<j\leq n-i$; and each of i, j, and n is an integer.

26. A display panel, comprising an array substrate, wherein the array substrate comprises a display region, the display region comprises a plurality of pixel circuit arranged in an array and a pixel circuit of the plurality of pixel circuits comprises:

a drive module, wherein a control terminal of the drive module is electrically connected to a first node, a first terminal of the drive module is electrically connected to a first power supply voltage terminal, and a second terminal of the drive module is electrically connected to a first electrode of a light-emitting element;

a first initialization module, wherein the first initialization module comprises a first N-type transistor and a second N-type transistor, wherein a control terminal of the first N-type transistor is electrically connected to a scan signal terminal, a first terminal of the first N-type transistor is electrically connected to a first reference signal terminal, a second terminal of the first N-type transistor is electrically connected to a first terminal of the second N-type transistor, a control terminal of the second N-type transistor is electrically connected to an enable signal terminal, and a second terminal of the second N-type transistor is electrically connected to the first node; and a data write module, wherein a control terminal of the data write module is electrically connected to the scan signal terminal, a first terminal of the data write module is electrically connected to a data signal terminal, and a second terminal of the data write module is electrically connected to the first terminal of the drive module;

wherein the pixel circuit further comprises a first scan signal line, a second scan signal line, a first enable signal line, and a second enable signal line which are extend along a first direction; and the first enable signal line and the second enable signal line are located on two sides of the drive module, respectively, the first scan signal line is located between the first enable signal line and the drive module, and the second scan signal line is located on a side of the first enable signal line facing away from the drive module.

27. A display device, comprising the display panel of claim 26.

* * * * *